US010464271B2

(12) United States Patent
Kim et al.

(10) Patent No.: US 10,464,271 B2
(45) Date of Patent: Nov. 5, 2019

(54) POLYANILINE/CARBON NANOTUBE SHEET NANOCOMPOSITES

(71) Applicants: National Institute of Aerospace Associates, Hampton, VA (US); U.S.A., as represented by the Administrator of the National Aeronautics and Space Administration, Washington, DC (US)

(72) Inventors: Jae-Woo Kim, Newport News, VA (US); Emilie J. Siochi, Newport News, VA (US); Kristopher E. Wise, Poquoson, VA (US); John W. Connell, Yorktown, VA (US); Yi Lin, Yorktown, VA (US); Russell A. Wincheski, Williamsburg, VA (US); Dennis C. Working, Norfolk, VA (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 923 days.

(21) Appl. No.: 13/987,706

(22) Filed: Aug. 24, 2013

(65) Prior Publication Data

US 2014/0103558 A1   Apr. 17, 2014

Related U.S. Application Data

(60) Provisional application No. 61/693,580, filed on Aug. 27, 2012, provisional application No. 61/827,885, filed on May 28, 2013.

(51) Int. Cl.
| | |
|---|---|
| *B29C 70/12* | (2006.01) |
| *B29C 70/54* | (2006.01) |
| *H01B 1/24* | (2006.01) |
| *B29C 70/40* | (2006.01) |
| *B29C 71/02* | (2006.01) |
| *B29C 70/42* | (2006.01) |
| *B29C 70/68* | (2006.01) |
| *B29C 70/88* | (2006.01) |

(52) U.S. Cl.
CPC .......... *B29C 70/543* (2013.01); *B29C 70/12* (2013.01); *B29C 70/40* (2013.01); *B29C 70/42* (2013.01); *B29C 70/682* (2013.01); *B29C 70/887* (2013.01); *B29C 71/02* (2013.01); *H01B 1/24* (2013.01); *B29C 2071/022* (2013.01)

(58) Field of Classification Search
CPC .................................................. B29C 70/40
USPC ................. 264/29.1, 319, 320, 330, 331.11
See application file for complete search history.

(56) References Cited

U.S. PATENT DOCUMENTS

| | | | | |
|---|---|---|---|---|
| 5,648,027 | A * | 7/1997 | Tajiri | C04B 35/80 156/306.6 |
| 6,713,034 | B2 * | 3/2004 | Nakamura | C04B 35/83 106/31.29 |
| 7,588,699 | B2 | 9/2009 | Park et al. | |
| 7,871,592 | B2 * | 1/2011 | Lin | B82Y 30/00 264/101 |
| 7,875,219 | B2 * | 1/2011 | Zhamu | H01G 9/058 264/109 |
| 7,906,043 | B2 | 3/2011 | Connell et al. | |
| 7,972,536 | B2 | 5/2011 | Connell et al. | |
| 2005/0034993 | A1 * | 2/2005 | Gozdz | H01M 4/13 205/57 |
| 2005/0186104 | A1 * | 8/2005 | Kear | B82Y 30/00 419/11 |
| 2009/0075545 | A1 * | 3/2009 | Lashmore | B29C 55/00 442/329 |
| 2010/0104849 | A1 * | 4/2010 | Lashmore | A61F 2/91 428/305.5 |
| 2011/0177393 | A1 * | 7/2011 | Park | B82Y 30/00 429/231.8 |
| 2013/0264116 | A1 * | 10/2013 | Lashmore | B05D 5/12 174/94 R |

OTHER PUBLICATIONS

Meng et al. A Promising Approach to Enhanced Thermoelectric Properties Using Carbon Nanotube Networks. Adv. Mater. 2010, 22, 535-539.*
Morákováet al. Enhanced thermal stability of multi-walled carbon nanotubes after coating with polyaniline salt. Polymer Degradation and Stability 97 (2012) 1405-1414.*
Kim et al. Polyaniline/Carbon Nanotube Sheet Nanocomposites: Fabrication and Characterization. Appl. Mater. Interfaces 2013, 5, 8597-8606.*
Trchováet al. Structural and conductivity changes during the pyrolysis of polyaniline base. Polymer Degradation and Stability 91 (2006) 114-121.*
Jin et al. Metal-free and electrocatalytically active nitrogen-doped carbon nanotubes synthesized by coating with polyaniline. Nanoscale, 2010, 2, 981-987.*
Feng et al. W ell-aligned polyaniline /carbon-nanotube composite films grown by in-situ aniline polymerization. Carbon 41 (2003) 1551-1557.*
Meng et al. Flexible carbon nanotube/polyaniline paper-like films and their enhanced electrochemical properties. Electrochemistry Communications 11 (2009) 186-189.*
Shi et al. Electrical and dielectric properties of multiwall carbon nanotube/polyaniline composites. J Polym Res (2009) 16:395-399.*

(Continued)

*Primary Examiner* — Atul P. Khare
(74) *Attorney, Agent, or Firm* — Jennifer L. Riley; Robin W. Edwards

(57) ABSTRACT

A method allows for preparation of CNT nanocomposites having improved mechanical, electrical and thermal properties. Structured carbon nanotube forms such as sheet, yarn, and tape are modified with π-conjugated conductive polymers, including polyaniline (PANI), fabricated by in-situ polymerization. The PANI modified CNT nanocomposites are subsequently post-processed to improve mechanical properties by hot press and carbonization.

17 Claims, 19 Drawing Sheets

(56) References Cited

OTHER PUBLICATIONS

Tomšík et al. Multi-wall carbon nanotubes with nitrogen-containing carbon coating. Chemical Papers 67 (8) 1054-1065 (2013).*
Konyushenko et al. Multi-wall carbon nanotubes coated with polyaniline. Polymer 47 (2006) 5715-5723.*
Hsu et al. Excellent performance of Pt0 on high nitrogen-containing carbon nanotubes using aniline as nitrogen/carbon source, dispersant and stabilizer. Chem. Commun., 2010, 46, 7628-7630.*
Gavrilov et al. Carbonized polyaniline nanotubes/nanosheets-supported Pt nanoparticles: Synthesis, characterization and electrocatalysis. Materials Letters 65 (2011) 962-965.*
Wang et al. Processing and property investigation of single-walled carbon nanotube (SWNT) buckypaper/epoxy resin matrix nanocomposites. Composites: Part A 35 (2004) 1225-1232.*
Cheng et al. (Functionalized Carbon-Nanotube Sheet/Bismaleimide Nanocomposites: Mechanical and Electrical Performance Beyond Carbon-Fiber Composites. Small 2010, 6, No. 6, 763-767.*
U.S. Appl. No. 61/621,847, published as US 2013/0264116, filed Apr. 9, 2012.*
U.S. Appl. No. 61/621,847, published as US 2013/0264116, filed Apr. 9, 2012 (Year: 2012).*
Wong E W et al, "Nanobeam Mechanics: Elasticity, Strength, and Toughness of Nanorods and Nanotubes," Science 1997, vol. 277, pp. 1971-1975.
Treacy. M. et al. "Nature: Exceptionally high Young's modulas observed for individual carbon nanotubes," Nature 1996, vol. 381, pp. 678-680.
Yu et al. "Stength and Breaking Mechanism of Multiwalled Carbon Nanotubes Under Tensile Load," Science, vol. 287, Jan. 28, 2000, pp. 637-640.
Zhu et al. "An Electromachanical Material Testing System for insitu Electron Microscopy and Applications," Proc. Natl. Acad. Sci., Oct. 11, 2005, vol. 102. No. 41, pp. 14503-14508.
Xie et al "Dispersion and Alignment of Carbon Nanotubes in Polymer Matrix: A review," Materials Science and Engineering, R49, (2005), pp. 89-112.
Moniruzzaman et al. "Polymer Nanocomposites Containing Carbon Nanotubes." Macromolecules 2006, vol. 39, pp. 5194-5205.
Coleman et al., "Small but Strong: A review of the mechanical properties of carbon nanotube-polymer composites." Carbon 2006, vol. 44, pp. 1624-1652.
Spitalsky et al. "Carbon nanotube-polymer composites: Chemistry, processing, mechanical and electrical properties," Progress in Polymer Science (2010), vol. 35, pp. 357-401.
Dalton et al. "Super-tough Carbon-nanotube Fibers," Nature vol. 423, Jun. 12, 2003, p. 703, Nature Publishing Group.
Liu et al. "Scratch-Resistant, Highly Conductive, and High-Strength Carbon Nanotube-Based Composite Yarns," ACS Nano 2010, vol. 4, No. 10, pp. 5827-5634.
Kis et al. "Reinforcement of single-walled carbon nanotube bundles by intertube bridging," Nature Materials, vol. 3, Mar. 2004, pp. 153-157.
Krasheninnikov et al. "Engineering of nanostructured carbon materials with electron or ion beams," Nature Materials, Oct. 2007 , vol. 6, pp. 723-733.
Peng et al. "Measurements of near-ultimate strength for multiwalled carbon nanotubes and irradiation-induced crosslinking improvements," Nature Nanotechnology, Oct. 2008, vol. 3, pp. 626-631.
Filleter et al. "Ultrahigh Strength and Stiffness in Cross-Linked Hierarchical Carbon Nanotube Bundles," Advanxe Mater, 2011, vol. 23, pp. 2855-2860.
Braga et al. "Single wall carbon nanotubes polymerization under compression: An atomistic molecular dynamics study," Chemical Physica Letters, vol. 419. (2006), pp. 394-399.
Crochet et al., "Synthesis of a new polyaniline/nanotube composite: "in-situ" polymerisation and charge transfer through site-selective interaction," Chem. Commun., 2001, pp. 1450-1451.
Zengin et al., "Carbon Nanotube Doped Polyaniline," Advance Mater. 2002, vol. 14, No. 20, pp. 1480-1483.
Feng et al., "Well-aligned polyaniline/carbon-nanotube composite films grown by in-situ aniline polymerization," Carbon 41 (2003) , pp. 1551-1557.
Sainz et al., "Soluble Self-Aligned Carbon Nanotube/Polyaniline Composites,"Adv. Mater. 2005, vol. 17, No. 3, pp. 278-281.
Y. Ma et al. "Improved Conductivity of Carbon Nanotube Networks by In Situ Polymerization of a Thin Skin of Conducting Polymer," ACS Nano 2008, vol. 2, No. 6, pp. 1197-1204.
Naraghi et al., "A Multiscale Study of High Performance Double-Walled Nanotube-Polymer Fibers," ACS Nano 2010, vol. 4, No. 11, pp. 6463-6476.
Boncel et al., "Enhancement of the Mechanical Properties of Directly Spun CNT Fibers by Chemical Treatment," ACS Nano 2011, vol. 5, No. 12, pp. 9339-9344.
Jin et al., "Metal-free electrocatalytically active nitrogen-doped carbon nanotubes synthesized by coating with polyaniline," Nanoscale, 2010, vol. 2, pp. 981-987.
Cheng et al., "Functionalized Carbon-Nanotube Sheet/ Bismaleimide Nanocomposites: Mechanical and Electrical Performance Beyond Carbon-Fiber Composites," Small 2010, vol. 6, No. 6. pp. 763-767.
Meng et al., "A Promising Approach to Enhanced Thermoelectric Properties Using Carbon Nanotube Networks," Adv. Mater, 2010, vol. 22, pp. 535-539.

* cited by examiner

Figure 2A
Figure 2B
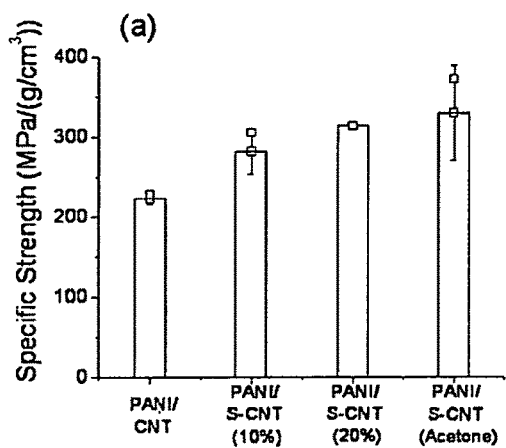
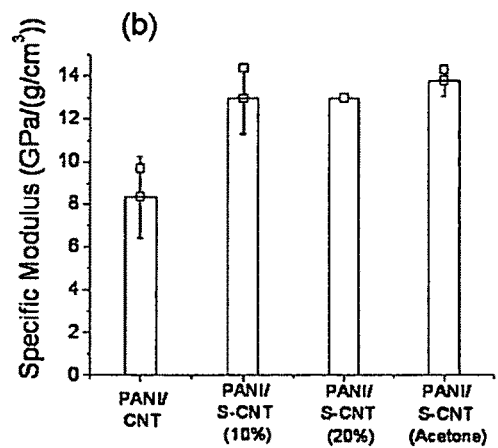
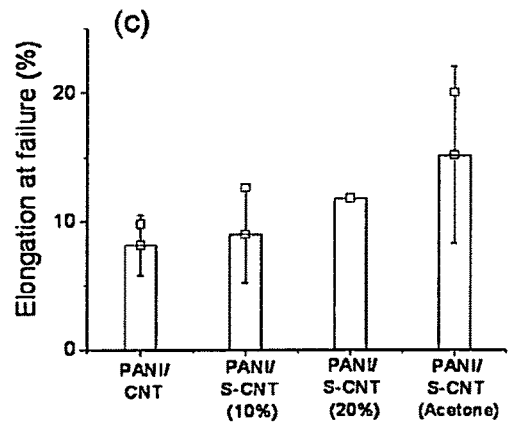
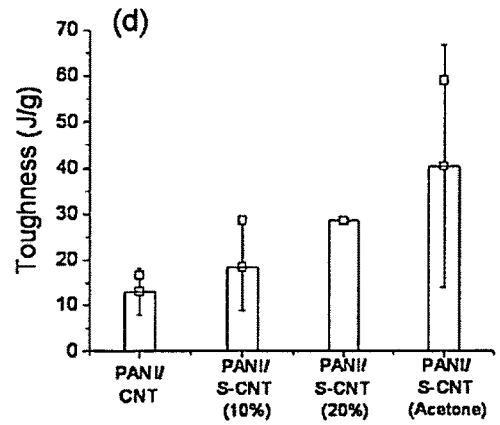
Figure 2C
Figure 2D

Figure 2E
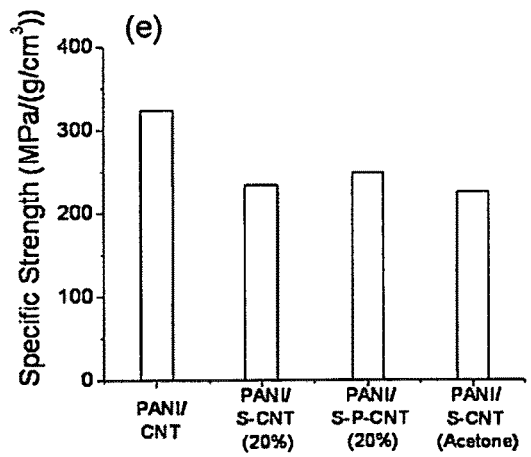
Figure 2F
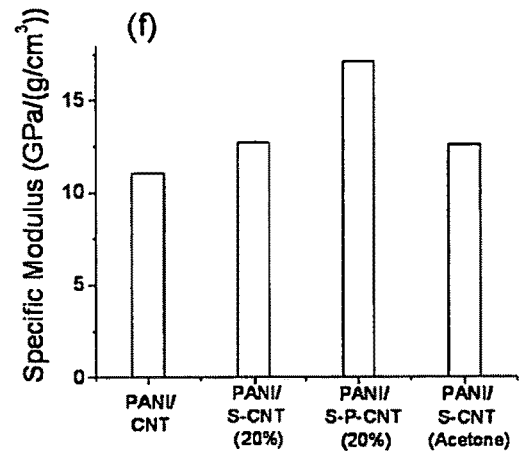
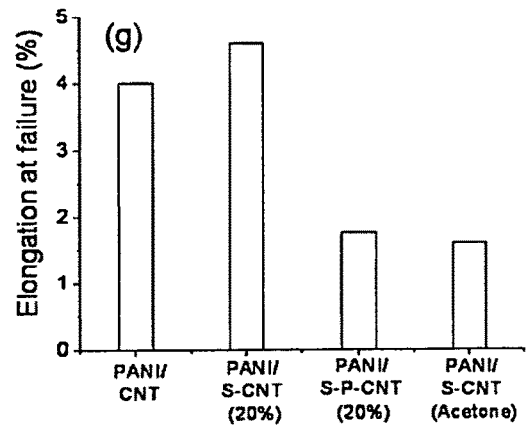
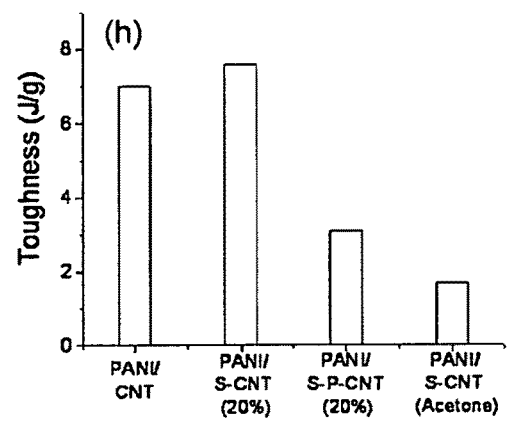
Figure 2G
Figure 2H

| Sample | tex (g/Km) | Weight ratio (CNT:PANI (or a-C)) (%) | Specific Ultimate Strength (N/tex) | Specific Young's modulus (N/tex) |
|---|---|---|---|---|
| Pristine CNT yarn | 1.571 | -- | 0.45 (at 17.8 %) | 14.4 |
| PANI/CNT yarn | 2.698 | 58 : 42 | 0.53 ± 0.02 (at 9 %) | 15.6 ± 1.3 |
| PANI/CNT yarn (hot press) | 2.727 | 58 : 42 | 0.52 (at 5.7 %) | 26.0 |
| PANI/CNT yarn (after carbonization) | 2.147 | 73 : 27 | 0.19 (at 0.9 %) | 23.0 |
| Hot pressed PANI/CNT yarn (after carbonization) | 2.060 | 77 : 23 | 0.19 (at 1.6 %) | 28.8 |

Figure 9

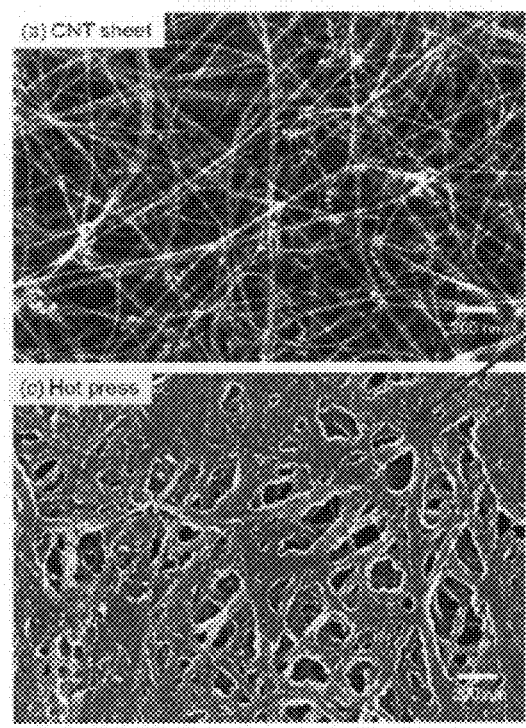
Figure 11A
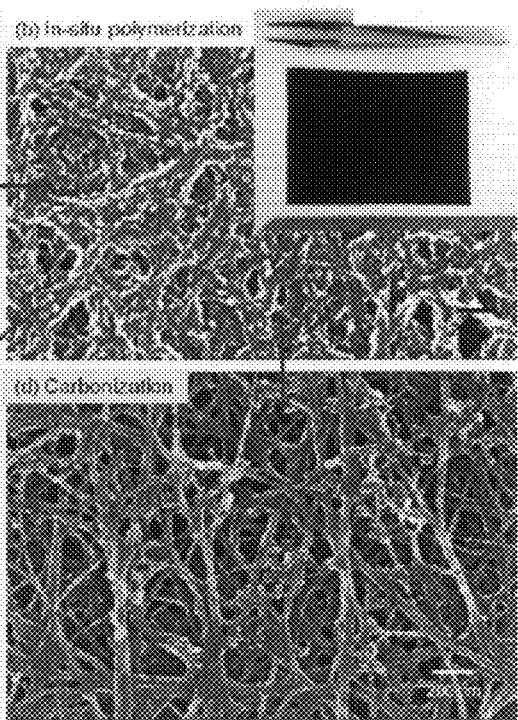
Figure 11B
Figure 11C
Figure 11D
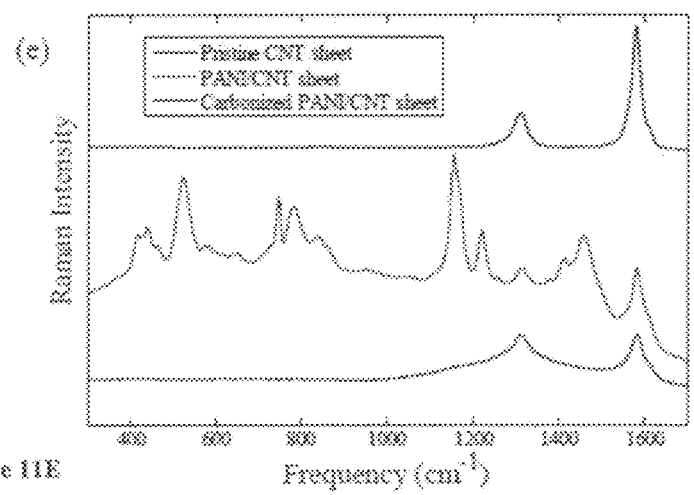
Figure 11E Figure 12A
Figure 12B
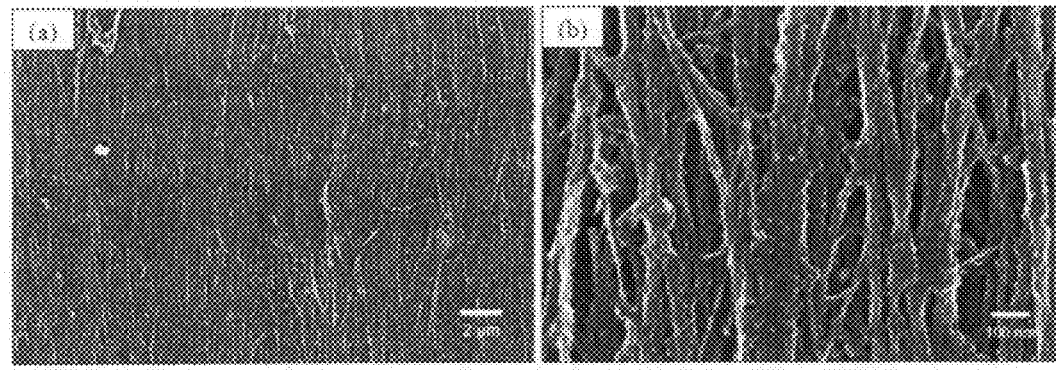
Figure 12C
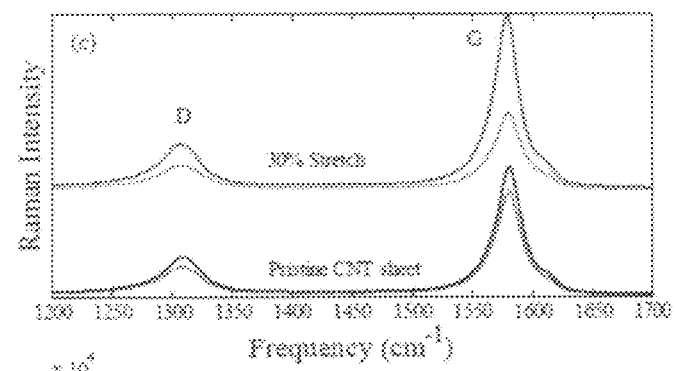
Figure 12D
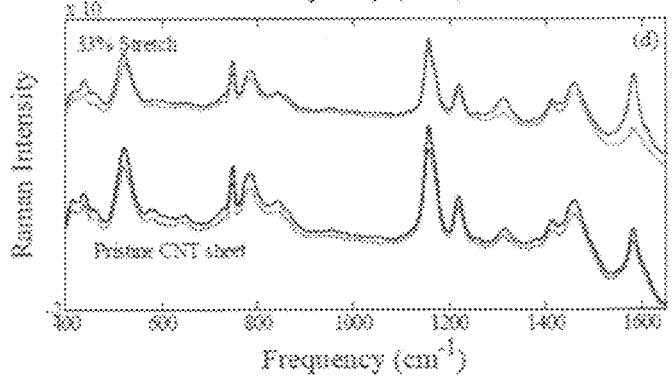

Figure 13A
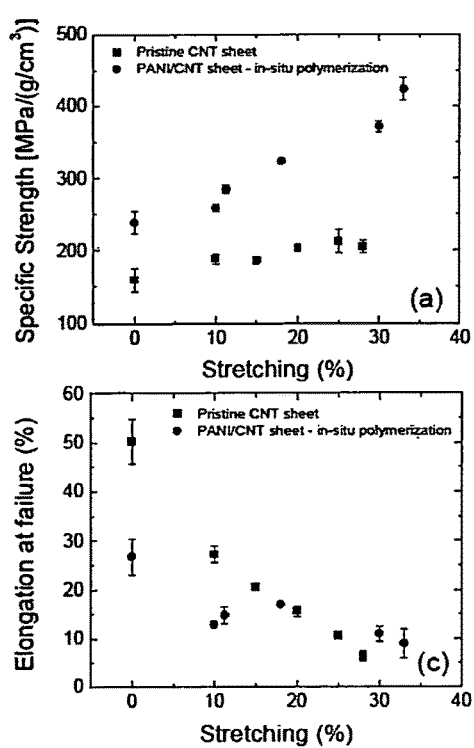
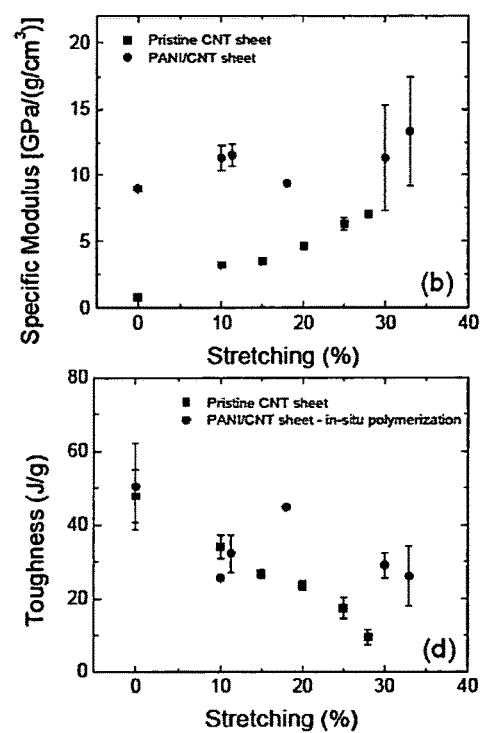
Figure 13B
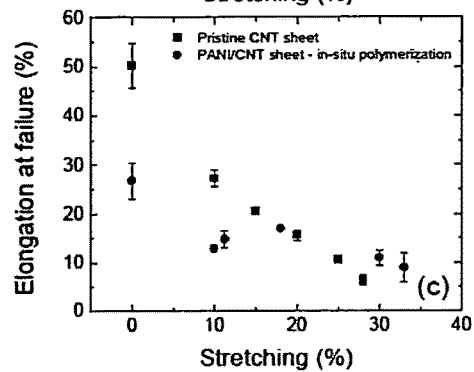
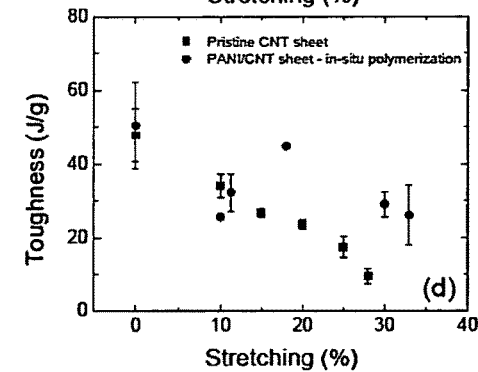
Figure 13C
Figure 13D Figure 14A
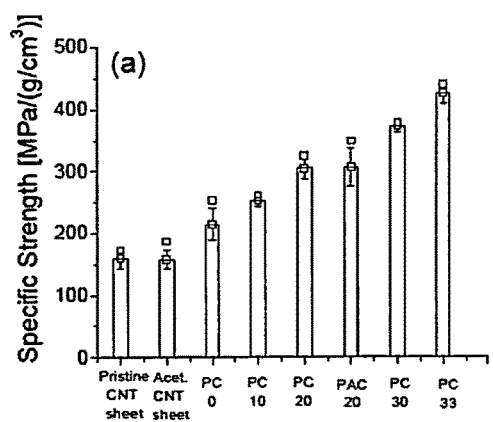
Figure 14B
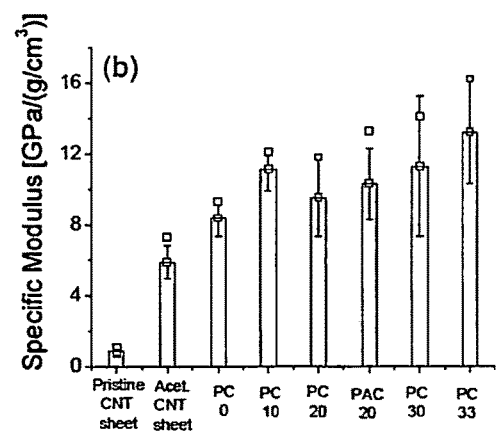
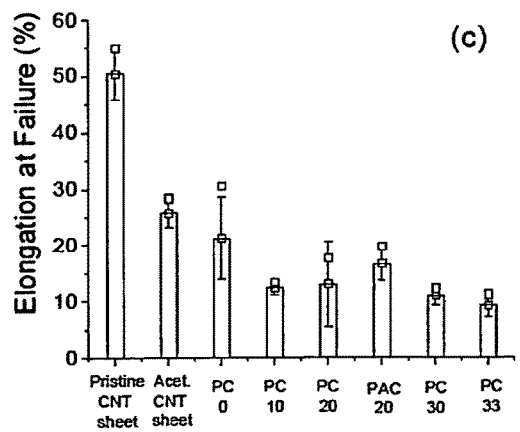
Figure 14C
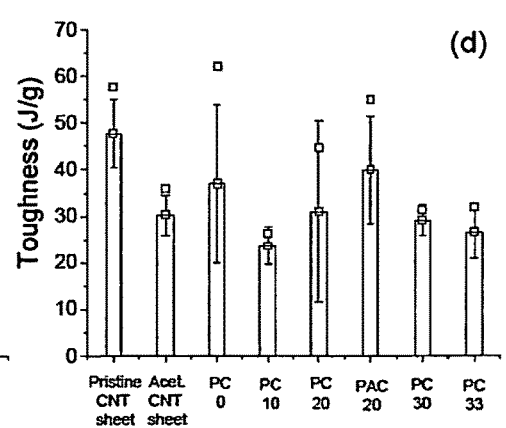
Figure 14D Figure 15A
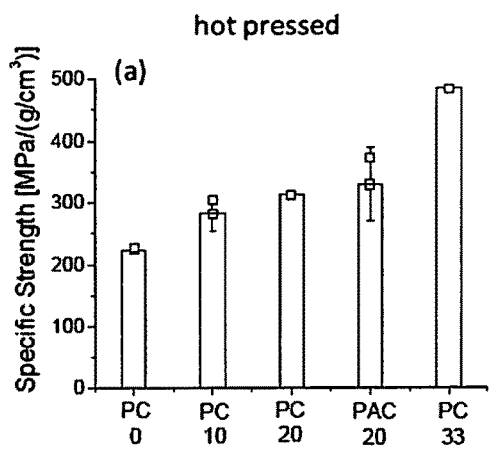
Figure 15B
Figure 15E
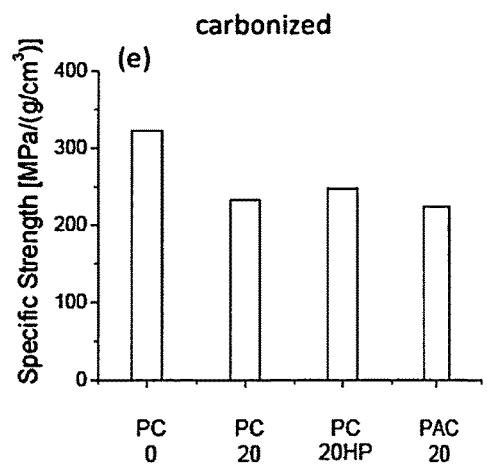
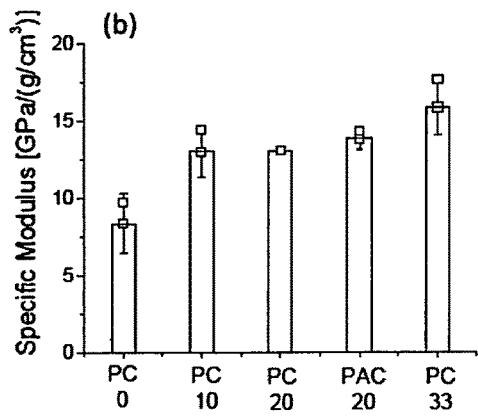
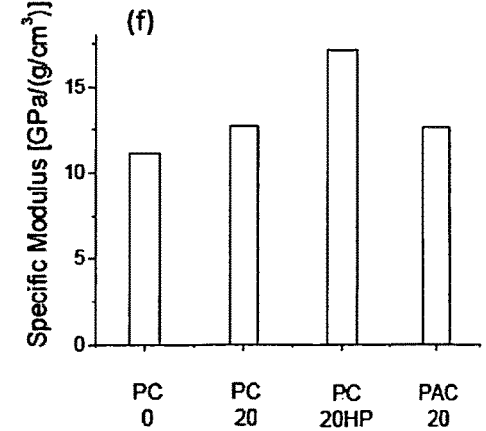
Figure 15F

POLYANILINE/CARBON NANOTUBE SHEET NANOCOMPOSITES

CROSS REFERENCE TO RELATED APPLICATION

This Application claims the benefit of U.S. Provisional Application No. 61/693,580 filed on Aug. 27, 2012 for "CONDUCTIVE POLYMER/CARBON NANOTUBE STRUCTURAL MATERIALS AND METHODS FOR MAKING SAME;" and U.S. Provisional Application No. 61/827,885 filed on May 28, 2013 for "CONDUCTIVE POLYMER/CARBON NANOTUBE STRUCTURAL MATERIALS AND METHODS FOR MAKING SAME." The contents of the foregoing applications are hereby incorporated by reference in their entirety.

STATEMENT REGARDING FEDERALLY SPONSORED RESEARCH OR DEVELOPMENT

The invention described herein was made in the performance of work under a NASA cooperative agreement and by employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the cooperative agreement recipient elected to retain title.

BACKGROUND OF THE INVENTION

1. Field of the Invention

The present invention relates to carbon nanotubes (CNTs), and, more particularly to CNT nanocomposites having improved mechanical properties.

2. Description of Related Art

All references listed in the appended list of references are hereby incorporated by reference, however, as to each of the above, to the extent that such information or statements incorporated by reference might be considered inconsistent with the patenting of this/these invention(s) such statements are expressly not to be considered as made by the applicant(s). The reference numbers in brackets below in the specification refer to the appended list of references.

Practical approaches are needed to take advantage of the nanometer scale mechanical properties of carbon nanotubes (CNTs) at the macroscopic scale. Utilizing the full mechanical capabilities of individual nanotubes is a primary research goal in nanotube reinforced nanocomposite materials. Most studies on structural applications of nanomaterials, such as carbon nanotubes (CNTs), have focused on attempts to improve dispersion in structural matrices to achieve or exceed the performance of state-of-the-art carbon fiber reinforced polymer (CFRP) composites. This approach has yet to yield mechanical properties that compete with CFRPs, the aerospace structural material of choice [9, 10], because CNTs have not demonstrated large load carrying capacity in nanocomposites due to poor intertube load transfer and physical defects created during processing and fabrication. In addition, the fabrication of high volume fraction CNT composites is difficult when using current processes for polymer composite fabrication because of CNT aggregation. Practical use of these nanomaterials will require the development of a method for creating stable and strong linkages between nanotubes without sacrificing their inherent mechanical properties. Cross-linking between shells via electron beam irradiation [11-14] and application of large compressive forces [33-37] have been studied and offer a viable approach to improve tube-to-tube load transfer and hence, mechanical properties. However, these approaches result in unwanted mechanical degradation and have limitations in scale-up for their applications to hierarchical macroscopic nanocomposite materials.

Several approaches have been developed to introduce cross-linking between CNT shells, including electron beam irradiation [11-15], application of large compressive forces [16,17], and chemical treatments.[18-20] These approaches were somewhat successful in improving tube-to-tube load transfer, which improved mechanical properties, but they also introduced unwanted defects in the CNTs and may be difficult to scale up for practical macroscale applications. Alternative approaches including the use of spinnable CNT forests as a starting material, physical densification and alignment of CNTs by solvent treatments [21] and fabrication using a prepreg-like process [22] have also been developed. The mechanical properties obtained from these materials are quite promising, but scale-up for large nanocomposite structure fabrication still poses significant challenges, especially with regards to the economic feasibility of building up sufficient laminate thickness without introducing defects. In fact, the mechanical properties of these nanocomposites were shown to decrease with increasing nanocomposite thickness. [22] CNT sheets are a promising format for producing high performance polymer nanocomposites with a high volume fraction of CNTs. Although these sheets are typically available with randomly aligned CNTs, they possess the elasticity to permit stretching to yield significant CNT alignment in the loading direction. [23] These sheets are commercially available in large volumes necessary to determine appropriate processing methods for producing structural nanocomposites. The sheet format also offers advantages such as ease of handling, being amenable to physical and chemical modification, and being used as a drop-in substitute for carbon fiber laminates in existing composite processing methods. High performance polymer/CNT sheet nanocomposites have been reported recently. [24,25] For example, Liang et al. reported MWCNT sheet reinforced bismaleimide (BMI) resin nanocomposites with a tensile strength of ~2 GPa, a Young's modulus of 169 GPa, and electrical conductivity of 5500 S/cm along the alignment direction. [25] They demonstrated that a straightforward mechanical stretching method followed by BMI infiltration is capable of producing high performance nanocomposites with high CNT concentration and low void volume fraction.

Recently, polyaniline has been used as a functionalization or "sizing" agent on CNTs for producing high volume fraction CNT fibers [26], CNT buckypaper [27], and CNT reinforced epoxy polymer nanocomposites. [28,29] However, most of the previous studies of PANI functionalization of CNTs have focused on attempts to disperse CNTs into solvents or polymer solutions, which were then further processed to make nanocomposites. Mechanical property enhancements were not significant due to low CNT loading content and insufficient CNT alignment in the nanocomposites. In addition to using PANI as a binder, additional heat treatment or carbonization can convert PANI into a nitrogen-containing carbon residue with potential applications in flame-retardant materials and energy conversion and storage. [30-32]

It is a primary object of the present invention to provide improved CNT nanocomposites.

It is an object of the invention to provide CNT nanocomposites having improved mechanical properties.

It is an object of the invention to provide CNT nanocomposites having improved electrical properties.

It is an object of the invention to provide CNT nanocomposites having improved thermal properties.

Finally, it is an object of the present invention to accomplish the foregoing objectives in a simple and cost effective manner.

The above and further objects, details and advantages of the invention will become apparent from the following detailed description, when read in conjunction with the accompanying drawings.

SUMMARY OF THE INVENTION

The present invention addresses these needs by providing a method for forming carbon nanotube nanocomposites with the steps of providing a carbon nanotube material, forming nanocomposites by in-situ polymerization in a solution containing monomers that polymerize to form π-conjugated conductive polymers, processing the formed nanocomposites by hot pressing, and following hot pressing, carbonizing the formed nanocomposites. The carbon nanotube material is preferably a carbon nanotube sheet, a carbon nanotube tape or a carbon nanotube yarn. The nanocomposite forming step is preferably performed by immersing the carbon nanotube material in an aniline solution, and most preferably by immersing the carbon nanotube material in an acidic aqueous solution containing a concentration of monomeric aniline where the aniline is polymerized on the carbon nanotube surfaces to result in PANI coated carbon nanotube sheets and the thickness of the PANI coated carbon nanotube sheets is controlled by adjusting the polymerization time and the aniline monomer concentration in the acidic aqueous solution. In the preferred embodiment, the hot pressing processing occurs at temperature of between room temperature and 300° C. and between 1 and 2 GPa of pressure and the carbonization occurs at a temperature of 800° C. in an inert atmosphere ($N_2$). In the embodiment in which the carbon nanotube material is a carbon nanotube, the carbon nanotube sheet is stretched prior to the in-situ polymerization step, most preferably from 0% to 33% and in a solvent such as acetone, methanol, N-methylpyrrolidone, or ethanol. Alternatively, the carbon nanotube sheet may be stretched in a dry environment. In an alternate embodiment, the carbonization step may be left out of the method with the remaining steps being as described.

BRIEF DESCRIPTION OF THE DRAWINGS

A more complete description of the subject matter of the present invention and the advantages thereof, can be achieved by reference to the following detailed description by which reference is made to the accompanying drawings in which:

FIG. 2A shows a comparison of the average specific strength of PANI/CNT sheet nanocomposites post-processed by hot press. The error bars represent the standard deviation in the values. The open squares are the measured maximum values at each sample;

FIG. 2B shows a comparison of the average specific modulus of PANI/CNT sheet nanocomposites post-processed by hot press. The error bars represent the standard deviation in the values. The open squares are the measured maximum values at each sample;

FIG. 2C shows a comparison of the average elongation at failure of PANI/CNT sheet nanocomposites post-processed by hot press. The error bars represent the standard deviation in the values. The open squares are the measured maximum values at each sample;

FIG. 2D shows a comparison of the average toughness of PANI/CNT sheet nanocomposites post-processed by hot press. The error bars represent the standard deviation in the values. The open squares are the measured maximum values at each sample;

FIG. 2E shows a comparison of the average specific strength of PANI/CNT sheet nanocomposites post-processed by carbonization;

FIG. 2F shows a comparison of the average specific modulus of PANI/CNT sheet nanocomposites post-processed by carbonization;

FIG. 2G shows a comparison of the average elongation at failure of PANI/CNT sheet nanocomposites post-processed by carbonization;

FIG. 2H shows a comparison of the average toughness of PANI/CNT sheet nanocomposites post-processed by carbonization;

FIG. 9 shows a shows a characteristics summary of processed PANI/CNT yarn nanocomposites;

FIG. 11A shows a High resolution-scanning electron microscopic (HR-SEM) image of the pristine CNT sheet (Nanocomp Technologies Inc.);

FIG. 11B shows a high resolution-scanning electron microscopic (HR-SEM) image of the PANI/CNT sheet nanocomposites after in-situ PANI polymerization and the inset shows a photograph of the as-prepared PANI/CNT nanocomposite;

FIG. 11C shows a High resolution-scanning electron microscopic (HR-SEM) image of the PANI/CNT sheet nanocomposites after in-situ PANI polymerization and then hot press;

FIG. 11D shows a High resolution-scanning electron microscopic (HR-SEM) image of the PANI/CNT sheet nanocomposites after in-situ PANI polymerization and then hot press and carbonization;

FIG. 11E shows a Stacked Raman spectra of Pristine CNT sheet, PANI/CNT sheet, and carbonized PANI/CNT sheet; the Intensity values for carbonized sample multiplied by a factor of 2 and all data was acquired with light polarized in the aligned CNT direction of the sheet;

FIG. 12A shows a high resolution-scanning electron microscopic (HR-SEM) image of 33% stretched CNT sheets modified with PANI at low magnification;

FIG. 12B shows a high resolution-scanning electron microscopic (HR-SEM) image of 33% stretched CNT sheets modified with PANI at high magnification;

FIG. 12C shows a stacked Raman spectra of pristine CNT sheets without and with 30% stretch where solid lines show data acquired with light polarized in the sheet stretching direction and dashed lines show data acquired with polarization optics perpendicular to stretched direction;

FIG. 12D shows a stacked Raman spectra of PANI/CNT nanocomposites without and with 33% stretch where solid lines show data acquired with light polarized in the sheet stretching direction and dashed lines show data acquired with polarization optics perpendicular to stretched direction;

FIG. 13A shows a comparison of the average specific strength of pristine CNT sheets and in-situ polymerized PANI treated CNT sheet nanocomposites in terms of the level of stretching where the error bars represent the standard deviation in the values;

FIG. 13B shows a comparison of the average specific modulus of pristine CNT sheets and in-situ polymerized PANI treated CNT sheet nanocomposites in terms of the level of stretching where the error bars represent the standard deviation in the values;

FIG. 13C shows a comparison of the average elongation at failure of pristine CNT sheets and in-situ polymerized PANI treated CNT sheet nanocomposites in terms of the level of stretching where the error bars represent the standard deviation in the values;

FIG. 13D shows a comparison of the average toughness of pristine CNT sheets and in-situ polymerized PANI treated CNT sheet nanocomposites in terms of the level of stretching where the error bars represent the standard deviation in the values;

FIG. 14A shows a comparison of the average specific strength of pristine CNT sheets and in-situ polymerized PANI treated CNT sheet nanocomposites with unstretched and stretched CNT sheets where the error bars represent the standard deviation in the values, the open squares are the measured maximum values for each sample, the level of stretch of CNT sheets before PANI polymerization was varied as 0, 10, 20, 30, and 33% and the resulting nanocomposites were named as PC0, PC10, PC20, PC30, and PC33, respectively; while the PAC20 represents a PANI/stretched CNT sheet nanocomposite prepared with a 20% stretched acetone treated CNT sheet;

FIG. 14B shows a comparison of the average specific modulus of pristine CNT sheets and in-situ polymerized PANI treated CNT sheet nanocomposites with unstretched and stretched CNT sheets where the error bars represent the standard deviation in the values, the open squares are the measured maximum values for each sample, the level of stretch of CNT sheets before PANI polymerization was varied as 0, 10, 20, 30, and 33% and the resulting nanocomposites were named as PC0, PC10, PC20, PC30, and PC33, respectively; while the PAC20 represents a PANI/stretched CNT sheet nanocomposite prepared with a 20% stretched acetone treated CNT sheet;

FIG. 14C shows a comparison of the average elongation at failure of pristine CNT sheets and in-situ polymerized PANI treated CNT sheet nanocomposites with unstretched and stretched CNT sheets where the error bars represent the standard deviation in the values, the open squares are the measured maximum values for each sample, the level of stretch of CNT sheets before PANI polymerization was varied as 0, 10, 20, 30, and 33% and the resulting nanocomposites were named as PC0, PC10, PC20, PC30, and PC33, respectively; while the PAC20 represents a PANI/stretched CNT sheet nanocomposite prepared with a 20% stretched acetone treated CNT sheet;

FIG. 14D shows a comparison of the average toughness of pristine CNT sheets and in-situ polymerized PANI treated CNT sheet nanocomposites with unstretched and stretched CNT sheets where the error bars represent the standard deviation in the values, the open squares are the measured maximum values for each sample, the level of stretch of CNT sheets before PANI polymerization was varied as 0, 10, 20, 30, and 33% and the resulting nanocomposites were named as PC0, PC10, PC20, PC30, and PC33, respectively; while the PAC20 represents a PANI/stretched CNT sheet nanocomposite prepared with a 20% stretched acetone treated CNT sheet;

FIG. 15A shows a comparison of the average specific strength of PANI/CNT sheet nanocomposites post-processed by hot press; where the error bars represent the standard deviation in the values, the open squares are the measured maximum values at each sample, the level of stretch of CNT sheet before PANI polymerization was varied as 0, 10, 20, and 33% and the resulting nanocomposites were named as PC0, PC10, PC20, and PC33, respectively, while the PAC20 represents a PANI/stretched CNT sheet nanocomposite prepared with a 20% stretched acetone treated CNT sheet and the PC20HP represents a PANI/stretched CNT sheet nanocomposite prepared with a 20% stretched CNT sheet and then experienced a hot press before carbonization;

FIG. 15B shows a comparison of the average specific modulus of PANI/CNT sheet nanocomposites post-processed by hot press; where the error bars represent the standard deviation in the values, the open squares are the measured maximum values at each sample, the level of stretch of CNT sheet before PANI polymerization was varied as 0, 10, 20, and 33% and the resulting nanocomposites were named as PC0, PC10, PC20, and PC33, respectively, while the PAC20 represents a PANI/stretched CNT sheet nanocomposite prepared with a 20% stretched acetone treated CNT sheet and the PC20HP represents a PANI/stretched CNT sheet nanocomposite prepared with a 20% stretched CNT sheet and then experienced a hot press before carbonization;

FIG. 15E shows a comparison of the average specific strength of PANI/CNT sheet nanocomposites post-processed by carbonization; where the level of stretch of CNT sheet before PANI polymerization was varied as 0 and 20% and the resulting nanocomposites were named as PC0 and PC20, respectively, while the PAC20 represents a PANI/stretched CNT sheet nanocomposite prepared with a 20% stretched acetone treated CNT sheet and the PC20HP represents a PANI/stretched CNT sheet nanocomposite prepared with a 20% stretched CNT sheet and then experienced a hot press before carbonization;

FIG. 15F shows a comparison of the average specific modulus of PANI/CNT sheet nanocomposites post-processed by carbonization; where the level of stretch of CNT sheet before PANI polymerization was varied as 0 and 20% and the resulting nanocomposites were named as PC0 and PC20, respectively, while the PAC20 represents a PANI/stretched CNT sheet nanocomposite prepared with a 20% stretched acetone treated CNT sheet and the PC20HP represents a PANI/stretched CNT sheet nanocomposite prepared with a 20% stretched CNT sheet and then experienced a hot press before carbonization;

DETAILED DESCRIPTION OF THE PREFERRED EMBODIMENT

Figure 1A:
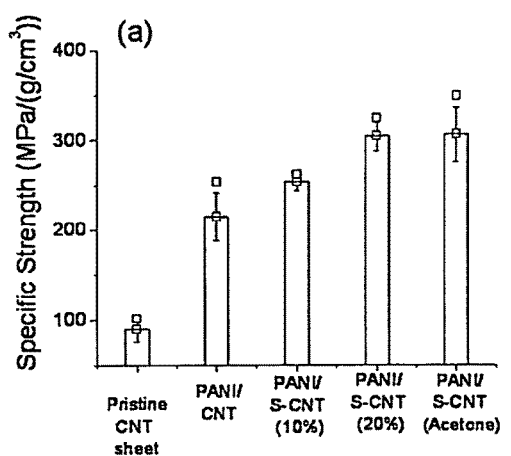
FIG. 1A shows a comparison of the average specific strength of acetone treated CNT sheet and in-situ polymerized polyaniline (PANI) treated CNT sheet nanocomposites with unstretched and stretched CNT sheets. The error bars represent the standard deviation in the values. The open squares are the measured maximum values at each sample.
Figure 1B:
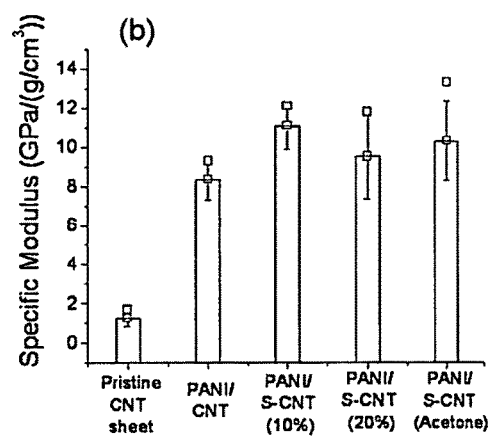
FIG. 1B shows a comparison of the average specific modulus, of acetone treated CNT sheet and in-situ polymerized PANI treated CNT sheet nanocomposites with unstretched and stretched CNT sheets. The error bars represent the standard deviation in the values. The open squares are the measured maximum values at each sample.
Figure 1C:
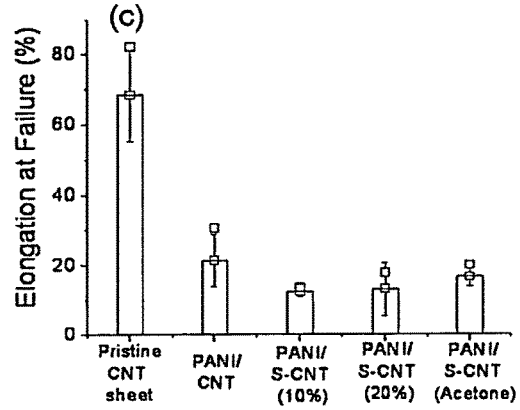
FIG. 1C shows a comparison of the average elongation at failure of acetone treated CNT sheet and in-situ polymerized PANI treated CNT sheet nanocomposites with unstretched and stretched CNT sheets. The error bars represent the standard deviation in the values. The open squares are the measured maximum values at each sample.
Figure 1D:
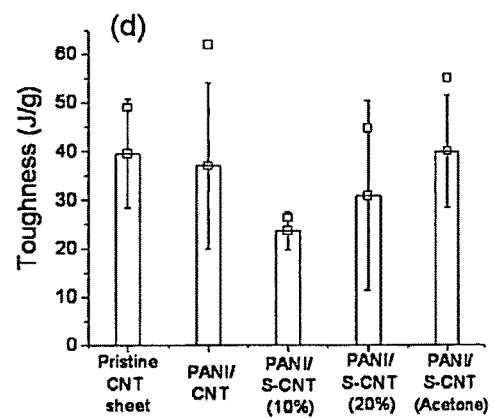
FIG. 1D shows a comparison of the average toughness of acetone treated CNT sheet and in-situ polymerized PANI treated CNT sheet nanocomposites with unstretched and stretched CNT sheets. The error bars represent the standard deviation in the values. The open squares are the measured maximum values at each sample.
Figure 3A:
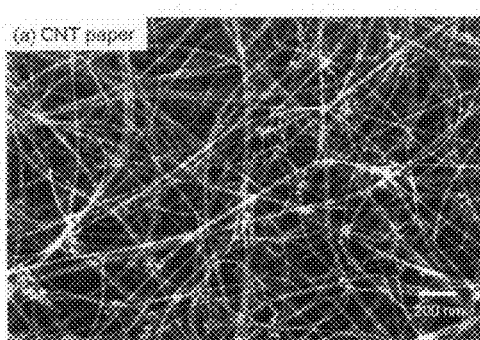
FIG. 3A shows a High Resolution-Scanning Electron Microscopy image of the CNT sheet (Nanocomp Technologies Inc.) and the PANI/CNT sheet nanocomposites.
Figure 3B:
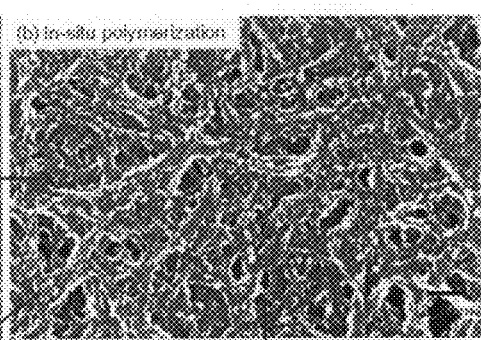
FIG. 3B shows a High Resolution-Scanning Electron Microscopy image of the CNT sheet (Nanocomp Technologies Inc.) and the PANI/CNT sheet nanocomposites after in-situ PANI polymerization.
Figure 3C:
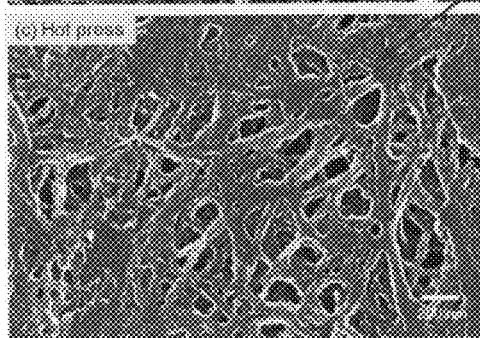
FIG. 3C shows a High Resolution-Scanning Electron Microscopy image of the CNT sheet (Nanocomp Technologies Inc.) and the PANI/CNT sheet nanocomposites after in-situ PANI polymerization and then hot press.
Figure 3D:
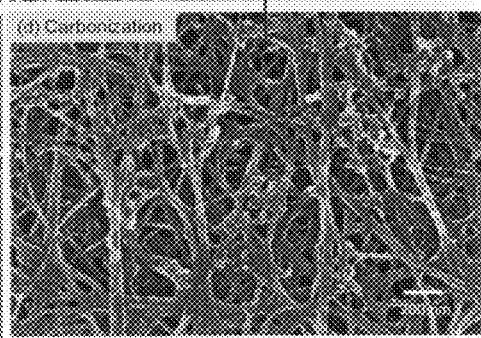
FIG. 3D shows a High Resolution-Scanning Electron Microscopy image of the CNT sheet (Nanocomp Technologies Inc.) and the PANI/CNT sheet nanocomposites after in-situ PANI polymerization and then carbonization.
Figure 4A:
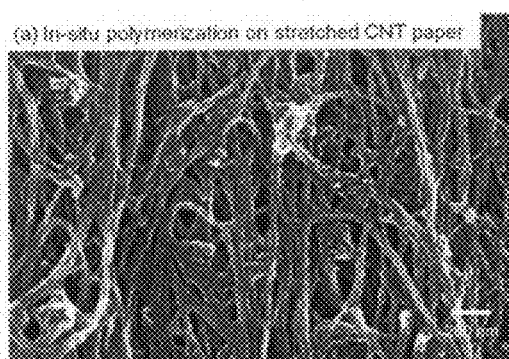
FIG. 4A shows a High Resolution-Scanning Electron Microscopy image of the PANI/stretched CNT sheet (20% of strain) nanocomposites after in-situ PANI polymerization.
Figure 4B:
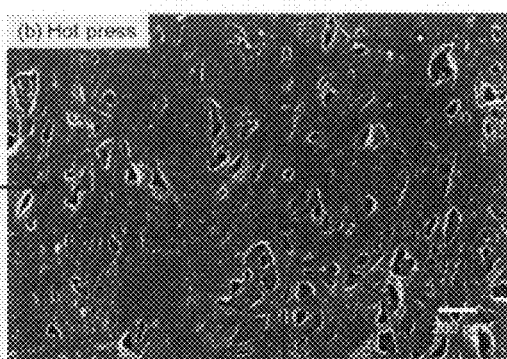
FIG. 4B shows a High Resolution-Scanning Electron Microscopy image of the PANI/stretched CNT sheet (20% of strain) nanocomposites after in-situ PANI polymerization and then hot press.
Figure 4C:
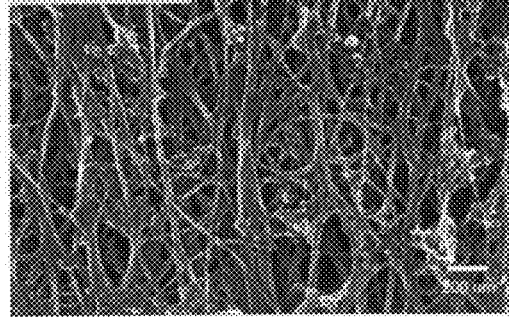
FIG. 4C shows a High Resolution-Scanning Electron Microscopy image of the PANI/stretched CNT sheet (20% of strain) nanocomposites after in-situ PANI polymerization and then carbonization.
Figure 4D:
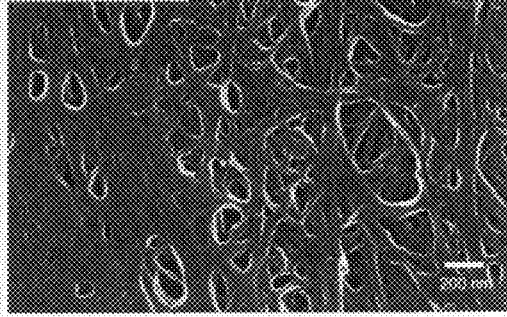
FIG. 4D shows a High Resolution-Scanning Electron Microscopy image of the carbonized PANI/stretched CNT sheet nanocomposites with the hot pressed one.

The following detailed description is of the best presently contemplated mode of carrying out the invention. This description is not to be taken in a limiting sense, but is made merely for the purpose of illustrating general principles of embodiments of the invention. The embodiments of the invention and the various features and advantageous details thereof are more fully explained with reference to the non-limiting embodiments and examples that are described and/or illustrated in the accompanying drawings and set forth in the following description. It should be noted that the features illustrated in the drawings are not necessarily drawn to scale, and the features of one embodiment may be employed with the other embodiments as the skilled artisan recognizes, even if not explicitly stated herein. Descriptions of well-known components and techniques may be omitted to avoid obscuring the invention. The examples used herein are intended merely to facilitate an understanding of ways in which the invention may be practiced and to further enable those skilled in the art to practice the invention. Accordingly, the examples and embodiments set forth herein should not be construed as limiting the scope of the invention, which is defined by the appended claims. Moreover, it is noted that like reference numerals represent similar parts throughout the several views of the drawings.

Carbon nanotubes (CNTs) show promise for multifunctional materials for a range of applications due to their outstanding combination of mechanical, electrical and thermal properties. The measured elastic moduli for CNTs range from 1.28 to 1.8 TPa [1, 2]. CNTs have exhibited breaking strengths ranging from 11 to 63 GPa [3, 4] and failure strain of 1.6% [4] under a tensile load. However, these promising mechanical properties have not translated well to CNT nanocomposites fabricated by conventional methods [5-8] due to the weak load transfer between tubes or tube bundles. There has been a need for an improved manufacturing method directed toward controlling the interactions between nanotubes, which play a major role in load transfer and electron and phonon transport. In this invention, the structured carbon nanotube forms such as sheet, yarn, and tape are modified with n-conjugated conductive polymers, including polyaniline (PANI), fabricated by in-situ polymerization. The PANI modified CNT nanocomposites are subsequently post-processed to improve mechanical properties by, preferably, both hot press and carbonization. To understand the mechanical properties of the fabricated PANI/CNT nanocomposites, mechanical tests were conducted, especially under a tensile load. This novel method demonstrates a significant improvement of mechanical properties of the PANI/CNT nanocomposites by combination of stretching, polymerization, hot pressing, and carbonization. The highest specific tensile strength of the PANI/stretched CNT nanocomposite is 484 MPa/(g/cm$^3$), achieved in a sample with about 42 wt. % of PANI which was fabricated by in-situ polymerization followed by hot pressing (see FIG. 15A). The highest specific Young's modulus is 17.1 GPa/(g/cm$^3$), which was measured on a sample formed by hot pressing and carbonization (see FIG. 15F). Additionally, the highest DC-electrical conductivity is 621 S/cm, which was measured on a sample formed by in-situ polymerization of PANI on the stretched CNT sheet. Specifically, in-situ polymerization of PANI with highly stretched CNT sheets is a relatively easy process because of favorable dispersion ($\pi$-$\pi$) interactions. The PANI essentially locks the physically aligned CNTs in place and does not require a complicated dispersion of CNTs into a solvent or polymer matrix. The demonstrated methods are relatively simple and scalable for structural applications. Additionally, the PANI/CNT nanocomposites exhibited good electrical conductivity, making them attractive for multifunctional structural applications.

The CNT starting material used in this work is in the form of either an acetone treated sheet or a yarn (Nanocomp Technologies, Inc.). Nanocomposites are formed by in situ polymerization in an aniline solution [33-37], followed by post-processing by a combination of, preferably, both hot pressing and carbonization. In this method, the sheet or yarn is first immersed in an acidic aqueous solution containing various concentrations of monomeric aniline. Dispersion interactions between the aromatic aniline monomers and the extended, delocalized pi electron system on the CNTs promote physical adsorption of aniline onto the CNTs. During the in-situ polymerization of aniline in the presence of the CNT nanostructures, aniline is preferentially polymerized on the CNTs' surfaces to result in PANI coated CNT sheets, the thickness of which may be controlled by adjusting the aniline monomer concentration in the solution. After polymerization, the PANI coated CNT material is post-processed by hot pressing at temperatures and pressures of approximately 100° C. and a few GPa, respectively. This treatment densifies the nanocomposite material by reducing voids and improves its mechanical properties by increasing the number and extent of intertube contacts. Finally, the samples are carbonized at high temperature (~800° C.) in an inert atmosphere ($N_2$). This process converts the PANI coating to amorphous carbon (a-C) which reduces the density of the sample and improves other physical properties. Some of the CNT sheets used in this work are stretched prior to the in-situ polymerization step. The sheets are stretched up to 25% strain, either dry or in solvents such as acetone, methanol, or ethanol. Stretching the unoriented sheets increases the alignment of the CNTs in the stretch direction, which densifies the sheet by eliminating some voids and improving tube packing. After carbonization, nanocomposites prepared with stretched CNT sheets are found to have higher Young's modulus at lower material density.

Figure 8:
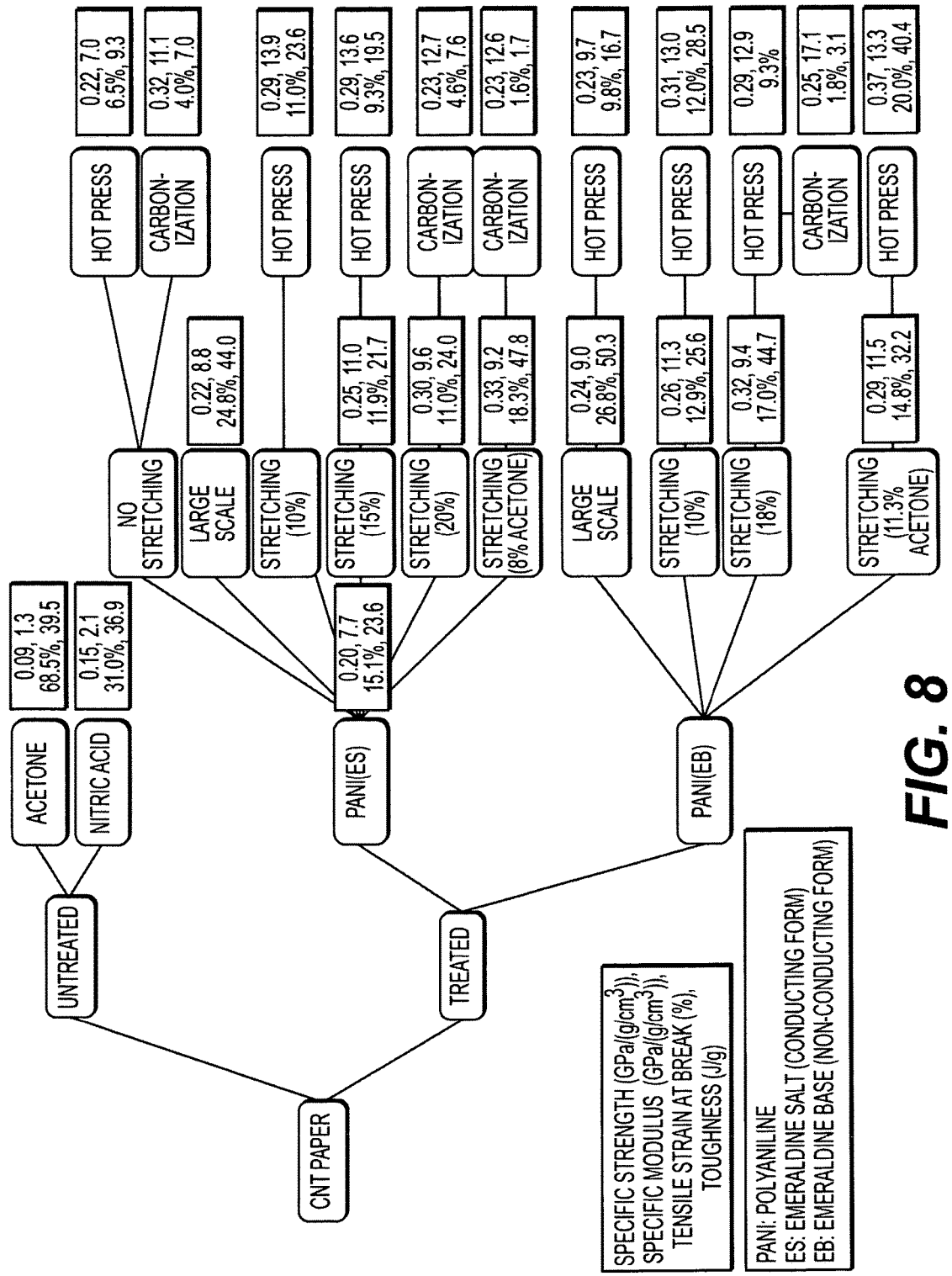
FIG. 8 shows a characteristics summary of the processed PANI/CNT sheet nanocomposites.
Figure 10A:
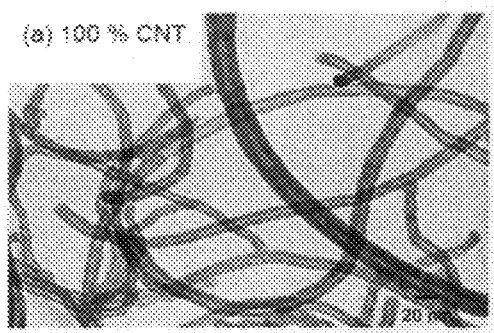
FIG. 10A shows a representative scanning transmission electron microscopic (STEM) image of 100 wt. % CNTs.
Figure 10B:
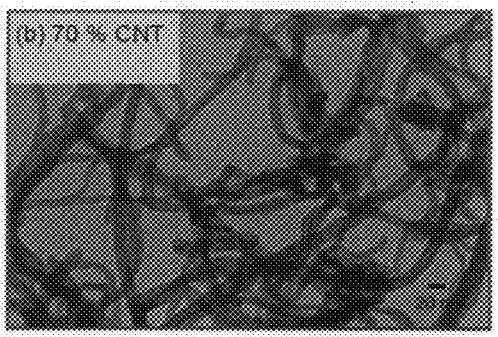
FIG. 10B shows a representative scanning transmission electron microscopic (STEM) image of 70 wt. % CNT/30 wt. % PANI.
Figure 10C:
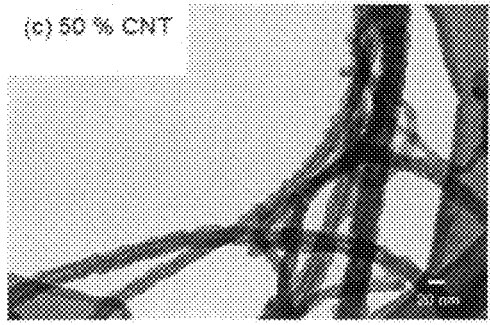
FIG. 10C shows a representative scanning transmission electron microscopic (STEM) image of 50 wt. % CNT/50 wt. % PANI.
Figure 10D:
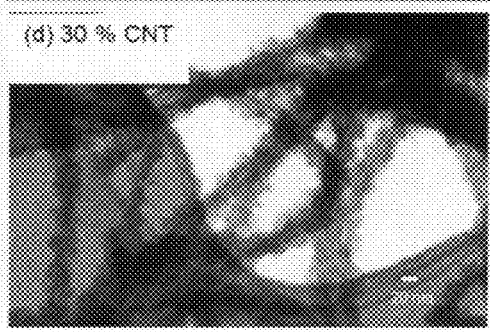
FIG. 10D shows a representative scanning transmission electron microscopic (STEM) image of 30 wt. % CNT/70 wt. % PANI.

Fabrication of PANI/CNT Sheet Composites and their Mechanical and Electrical Properties The PANI/CNT nanocomposites are mechanically tested using a micro tensile tester. An Instron 5848 Microtester is used to measure force-displacement data used to calculate specific elastic modulus (Young's modulus), specific ultimate strength and ultimate tensile strain. The tensile stress is calculated by dividing the measured force by the cross-sectional area of the PANI/CNT sheet nanocomposites, which is obtained with an instrument for film thickness measurements and confirmed by microscopic measurements. All data are normalized by the density of the PANI/CNT sheet nanocomposites. The tensile testing methods are modified from ASTM standards including D882 (Standard test method for tensile properties of thin plastic sheeting), D638 (standard test method for tensile properties of plastics), and D1708 (standard test method for tensile properties of plastics by use of microtensile specimens). The gauge length and a crosshead speed are set at 10 mm and 10 mm/min, respectively, for the PANI/CNT sheet nanocomposites under a tensile load. The Young's modulus is obtained from linear regression at a maximum slope of the corresponding stress-strain curve. The fabricated PANI/CNT sheet composites and their mechanical properties are summarized in FIGS. 1, 2 and 8, respectively. The measured specific tensile strength and specific Young's modulus of the untreated CNT sheet were 160±16 MPa/(g/cm$^3$) and 0.8±0.3 GPa/(g/cm$^3$), respectively, and the elongation at failure was 50.3±4.5%. In-situ polymerization, which resulted in PANI reinforcement of the CNT networks, increased the specific strength to 239±16 MPa/(g/cm$^3$). The Young's modulus increased by an order of magnitude to 9.0±0.2 GPa/(g/cm$^3$) compared to the untreated CNT sheet. The specific tensile strength and the specific Young's modulus dramatically increase with the PANI/stretched CNT sheet nanocomposites due to alignment of the CNTs along the tensile load direction during the stretching. Generally, the specific tensile strength increases as the level of CNT stretching increases. So far, the highest specific tensile strength is obtained with the hot-pressed PANI/stretched CNT sheet nanocomposites (484 MPa/(g/cm$^3$)) in which the 33% stretched CNT sheet was impregnated with PANI via in-situ polymerization, and then consolidated by hot pressing. The highest specific Young's modulus is obtained with the PANI/stretched CNT sheet nanocomposite after hot pressing and carbonization, reaching up to 17.1 GPa/(g/cm$^3$). Generally, hot pressing has a larger effect on tensile strength, while carbonization mostly increases the Young's modulus. The elongation to failure is considerably decreased by in-situ polymerization and even more significantly by stretching and carbonization. As a result of decreasing strain at failure, the toughness decreases significantly, especially, after carbonization process. For example, the toughnesses of the PANI/stretched CNT sheet nanocomposites were in the range of 1.7 to 7.6 J/g after carbonization while that of the untreated CNT sheet was 47.8±7.3 J/g. While hot pressing improved the strength of the PANI/CNT nanocomposites, there was minimal decrease in toughness to 40 J/g at 20% stretch. The toughness value is somewhat lower than that of state-of-the-art CNT yarns (close to 100 J/g). [42, 20] It is worthwhile to note that there is no significant dependence of the mechanical properties on the initial form of the PANI, i.e. emeraldine salt (electrically conductive form) or emeraldine base (non-conductive form). Overall, the PANI/CNT sheet nanocomposites fabricated by in-situ polymerization are comprised of CNTs that are coated uniformly by PANI and are interconnected between the CNT bundles through the thickness of the film (FIGS. 3 and 4). The primary effect of hot pressing the PANI/CNT nanocomposites is increased density of the material due to reduction of void space inside the film. In fact, hot pressing reduces the thickness of the PANI/CNT nanocomposites by 10 to 50%, depending on the level of applied pressure. Additionally, the hot press can be used to consolidate layers of PANI/CNT sheets to produce macro-scale PANI/CNT nanocomposites, analogous to current carbon fiber composite fabrication methods.

Figure 5:
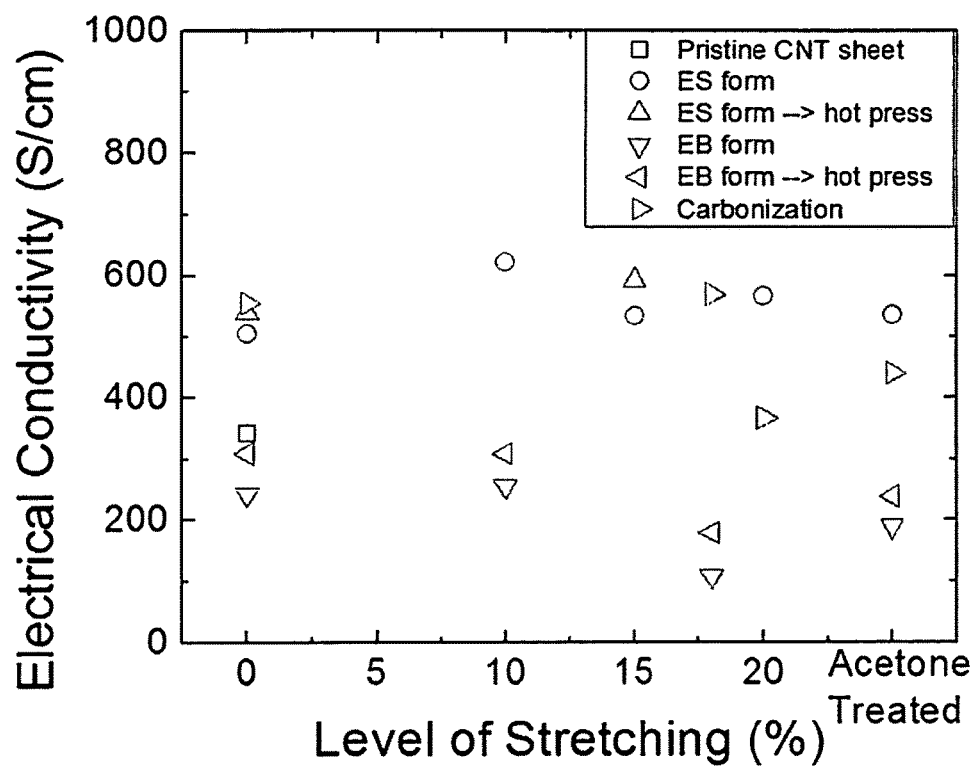
FIG. 5 shows The DC-electrical conductivity of the processed PANI/CNT sheet nanocomposites.

The DC electrical conductivity of PANI/CNT nanocomposites is measured using a 4-point probe equipment and summarized in FIG. 5. The DC-electrical conductivity of the pristine CNT sheet is 342±37 S/cm. Generally, the DC-electrical conductivity has a significant dependence on the initial form of the PANI. The highest DC-electrical conductivity is obtained with the PANI/stretched CNT sheet nanocomposites (621±10 S/cm) in which the PANI is in the form of an emeraldine salt. Typically, hot pressing increases the electrical conductivity due to densification of the materials, while carbonization has no significant effect on the PANI form or the history, i.e., the previous treatment steps prior to carbonization step, of the materials.

Fabrication of PANI/CNT Yarn Nanocomposites and their Mechanical Properties

Figure 6:
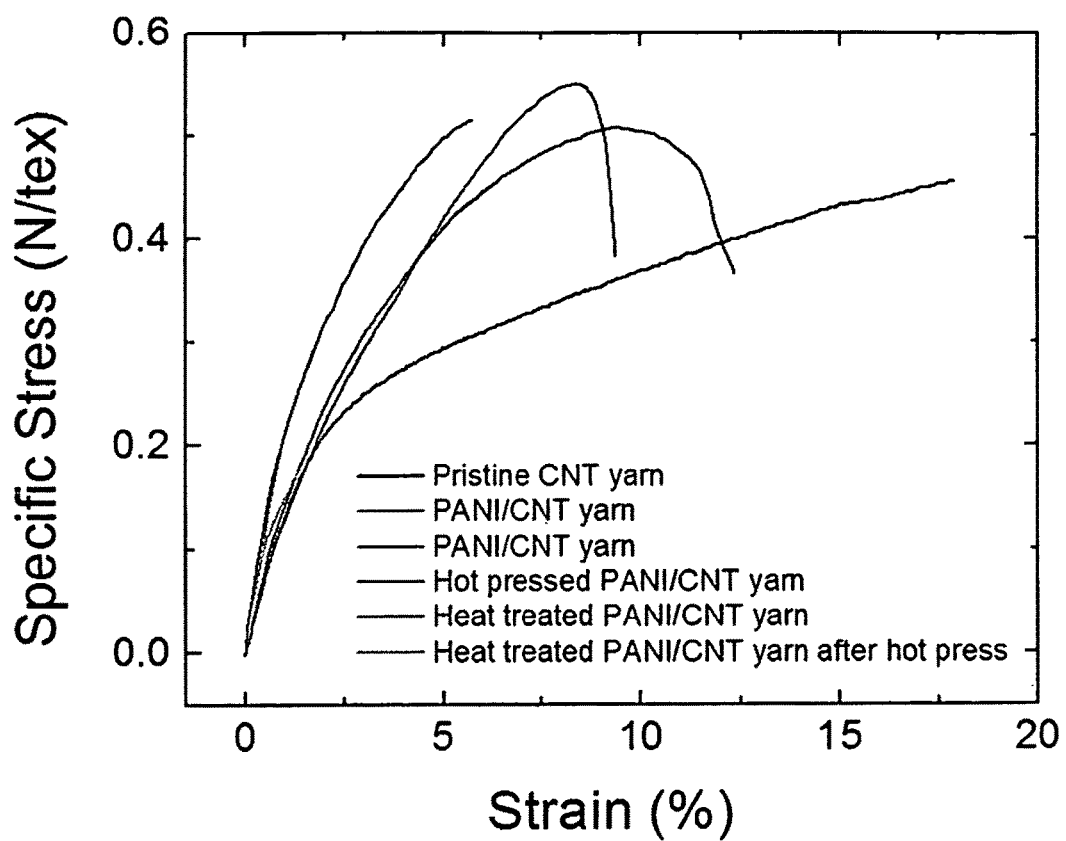
FIG. 6 shows the representative stress-strain curves of the processed PANI/CNT yarn nanocomposites under a tensile load.
Figure 7A:
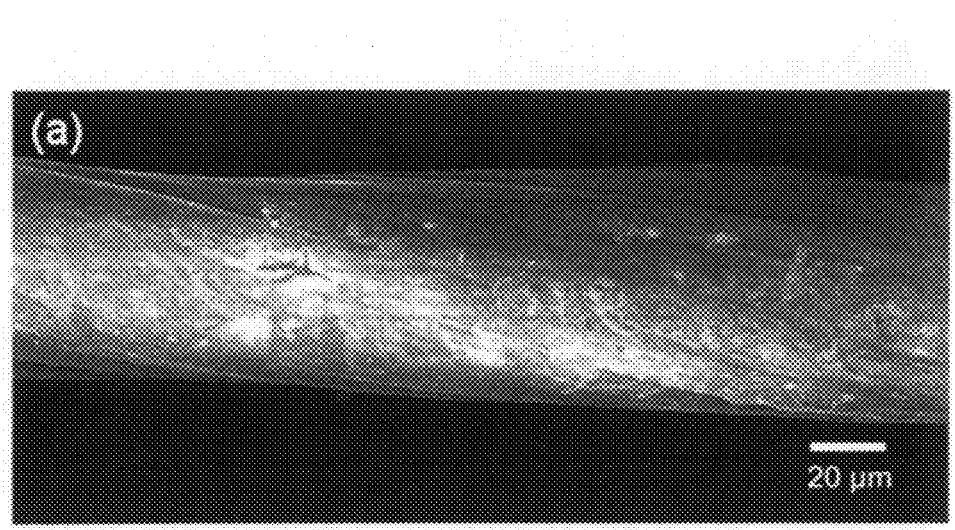
FIG. 7A shows a High Resolution-Scanning Electron Microscopy image of the PANI/CNT yarn nanocomposites after in-situ polymerization.
Figure 7B:
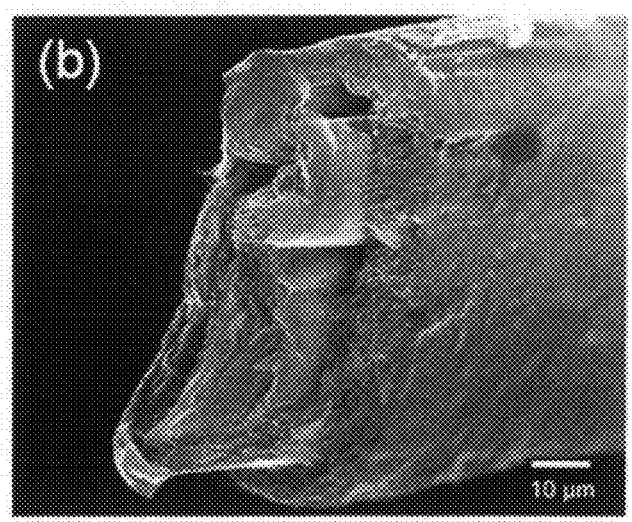
FIG. 7B shows a High Resolution-Scanning Electron Microscopy image of the PANI/CNT yarn nanocomposites after in-situ polymerization and then hot press.

Details of the pristine, PANI coated, and carbonized CNT yarns are summarized in FIGS. 6 and 9, respectively. The PANI/CNT yarn nanocomposites are mechanically tested using a micro tensile tester. The specific tensile stress is calculated by dividing the measured force by the tex value (g/km) of the PANI/CNT yarn nanocomposites. The tensile testing methods are modified from ASTM standards including D3822 (standard test method for tensile properties of single textile fibers) and D1708 (standard test method for tensile properties of plastics by use of microtensile specimens). The gauge length is set at 10 or 20 mm, and the crosshead speed is 7.5 mm/min for PANI/CNT yarn nanocomposites under a tensile load. The specific tensile strength increases significantly after in-situ polymerization of PANI (0.53±0.02 N/tex) which is equivalent to 0.53±0.02 GPa/(g/cm$^3$). In the case of the PANI/CNT yarn nanocomposites, hot pressing does not affect the tensile strength (0.52 N/tex), though it does improve Young's modulus. Carbonization reduces the specific strength while the Young's modulus remains the same. The CNT yarn is too dense for PANI to effectively penetrate through the thickness during in-situ polymerization (FIG. 7).

Experimental Process

The CNT starting materials used in this work were in the form of CNT powder (Bayer multi-walled carbon nanotubes (MWCNTs), Baytubes C150 HP, 99% purity), as well as both untreated (catalyst content: 10.9 wt %, average areal density: 11.0 g/m2) and acetone treated (catalyst content: 10.3 wt %, average areal density: 15.5 g/m2) CNT sheets (Nanocomp Technologies, Inc.). Aniline (Aldrich, 99.8%), ammonium persulfate ((NH4)2S2O8, Aldrich, 98+%), ammonium hydroxide (Fisher, 29.9%) and various organic solvents were used as received.

Some of the CNT sheets used in this work were stretched prior to the in-situ polymerization step. The sheets were stretched in tension up to 33% strain at a crosshead speed of 1 mm/min at ambient temperature. Stretching was done with either dry sheets or sheets wetted with a solvents such as acetone, ethanol, or N-methylpyrrolidone (NMP). Nanocomposites were formed by subjecting the CNT sheet to in-situ polymerization in an aniline solution using procedures documented in the literature [33-37], followed by post-processing with a combination of hot pressing and carbonization. The CNT powder and sheet were first immersed in an acidic aqueous solution containing various concentrations of aniline. For the powder preparation, the mixed solution of MWCNT and aniline was dispersed in an aqueous 3-(N-morpholino)-propanesulfonic acid (MOPS) buffered solution without any additional surfactants or additives.[38] Aniline polymerized on the CNTs surfaces to yield PANI/CNT nanocomposites. Adjusting the aniline monomer concentration in the solution controlled the thickness of the PANI/CNT nanocomposites. PANI/CNT sheet nanocomposites were prepared by in-situ polymerization of aniline in an acidic solution bath (1 M HCl) with ammonium persulfate as the oxidant in the presence of CNT sheet. The weight ratio between the CNT sheet and aniline was 1 to 5 and the mole ratio between the aniline monomer and the oxidant is 1 to 1. The emeraldine base form (EB, electrically non-conductive) of PANI/CNT sheet nanocomposite was obtained by stirring the as prepared (emeraldine salt form (ES)—electrically conductive) nanocomposite into a diluted ammonium hydroxide solution (3 wt. %) for 15 hours. After polymerization, the PANI/CNT nanocomposite was post-processed by hot pressing (Carver Inc., hydraulic unit model #3925) at 100° C. and approximately 1~2 GPa of pressure. Additionally, some samples were carbonized at up to 2000° C. in an inert atmosphere (N2) to convert the PANI coating into amorphous carbon (a-C). The carbonization process was done in a vacuum furnace (R. D. Webb, Red Devil) at atmospheric pressure and a constant N2 gas with a flow rate of 2 ft$^3$/hr. Temperature was ramped up at 10° C./min and then held for 10 minutes to complete the carbonization. Tension was not applied to the PANI/CNT nanocomposite during the carbonization process.

Raman spectroscopy was performed using a Kaiser RAMANRXN1™ Microprobe. All measurements were performed at an excitation wavelength of 785 nm and laser output power of 50 mW. Polarization optics were incorporated to enable acquisition of Raman spectra as a function of angle between the natural rolling direction of the sheets and the polarization direction. Thermogravimetric analysis (TGA—Netzsch TG 209 F1) and differential scanning calorimeter (DSC—Netzsch DSC 204 F1) were carried out under nitrogen at heating rates of 5° C./min and 10° C./min, respectively.

The pristine CNT sheets and PANI/CNT nanocomposites were mechanically tested (at least 5 samples) at room temperature using an Instron 5848 Microtester. The measured force-displacement data were used to calculate specific elastic modulus (Young's modulus), specific ultimate strength and ultimate tensile strain. The tensile stress was obtained by dividing the measured force by the cross-sectional area of the PANI/CNT sheet nanocomposites, which was determined with a micrometer and confirmed by microscopy measurements. All data were normalized by the density of the PANI/CNT sheet nanocomposites as determined by the sample dimension and weight. The tensile testing method was based on ASTM standards including D882 (standard test method for tensile properties of thin plastic sheeting) and D1708 (standard test method for tensile properties of plastics by use of microtensile specimens). The tensile samples were cut into 5.08±0.03 mm wide rectangular strips using a JDC precision sample cutter (Thwing-Albert Instrument Company). The thickness of the prepared nanocomposites ranged from 20 to 50 µm. PANI content in the prepared PANI/CNT nanocomposites ranged from 42 to 58 wt. %, except for the carbonized nanocomposites. The measured densities of pristine CNT sheet, in-situ polymerized PANI/CNT, hot pressed PANI/CNT and carbonized PANI/CNT composites were 0.566±0.011, 0.816±0.147, 1.218±0.143, and 0.636±0.132 g/cm3, respectively. Gage length and crosshead speed for the tensile test were set at 10 mm and 10 mm/min, respectively. Strain was calculated from crosshead displacement. The Young's modulus was obtained from linear regression at the maximum slope of the corresponding stress-strain curve. Toughness was calculated by measuring the area under stress-strain curve up to failure.

A field emission-scanning electron microscope (FE-SEM, Hitachi S-5200) equipped with a scanning transmission electron microscope (STEM) detector was used to image both as-processed PANI/CNT nanocomposites and cross-sectioned samples of failed specimens after a tensile test. A Gatan Microtester 200 stage and Deben controller equipped with a digital optical microscope (Mighty Scope) were used for in-situ fracture imaging. DC conductivities of the PANI/CNT nanocomposites were measured with a 4-probe system (Signatone, QuadPro Resistivity Wafer Mapping System).

In-situ polymerization of aniline with individual CNTs. Before applying PANI coating directly to the CNT sheet materials, eight polyaniline nanocomposites with 0, 0.5, 1, 5, 10, 30, 50, and 70 wt % MWCNT were synthesized to understand the interaction between aniline and CNT during in-situ polymerization of aniline in buffer-stabilized MWCNT dispersion solutions. The mechanism of in-situ polymerization has been discussed previously. [33-37] Dispersion interactions between the it electrons in the aromatic aniline monomers and the extended, delocalized π-electron system on the CNTs promoted physical adsorption of the monomers onto the nanotube surface and resulted in a good dispersion of the nanotubes in the aqueous buffer solution. The same dispersion interaction between the CNT and the aniline monomer that yields a good dispersion may also promote polymerization along the CNT to afford PANI-coated MWCNTs. The conversion yield of PANI increased as a function of MWCNT concentration from 64.2 at 0 to 93.2% at 70 wt %. This enhanced conversion suggests that the CNT surface provides reactive sites where polymerization can occur. Increased reactivity can lead to improved reaction efficiency and thus lower production costs if this process were scaled up.

FIG. 10 shows STEM images of pristine MWCNTs (FIG. 10a), 70 wt % (FIG. 10b), 50 wt % (FIG. 10c), and 30 wt % (FIG. 10d) MWCNT-PANI nanocomposites, respectively. The pristine MWCNT diameters were in the range of 10 to 25 nm (FIG. 10a). The functionalized MWCNTs were very uniformly and completely coated by a PANI layer (FIGS. 10b, 10c, and 10d). SEM images revealed a beaded surface on the CNTs, with coating features being increasingly rougher as the PANI concentration increased (FIGS. 10c and 10d). The thickness of the PANI layer on the MWCNT surface decreased with decreasing PANI content in the nanocomposites. After in-situ polymerization of PANI, the diameters of 30 wt % MWCNT/PANI nanocomposite increased to about 20~50 nm while the diameters of 50 wt % MWCNT/PANI hybrid were 10~40 nm. The PANI layer thickness typically ranged from 3 nm to 20 nm. Note that the sidewalls of the MWCNT are not visible under a microscope below 30 wt % MWCNT concentration due to the presence of a thick layer of PANI.

Fabrication of PANI/CNT Sheet Nanocomposites and their Mechanical and Electrical Properties.

Following the guidance from the above model reactions performed using MWCNTs, PANI/CNT sheet nanocomposites were fabricated by in-situ polymerization of aniline monomer onto a pristine CNT sheet (FIG. 11a). FIG. 11b shows that polymeric materials were well coated on the CNTs and interconnected between the CNT bundles. After subsequent hot pressing (FIG. 11c) or carbonization processes (FIG. 11d), the overall CNT network in the nanocomposite was retained, but the morphology of the polymeric coatings exhibited discernible changes. The primary effect of hot pressing PANI/CNT nanocomposites was increased density of the material due to reduction of voids within the nanocomposite. In fact, hot pressing reduced the thickness of the PANI/CNT nanocomposites by 10 to 50%, depending on the level of stretch and applied pressure. Hot pressing consolidated layers of PANI/CNT sheets to produce macro-scale PANI/CNT nanocomposites in a process similar to current carbon fiber composite fabrication methods.

Raman spectra of the pristine CNT sheet, PANI/CNT sheet, and carbonized CNT sheet are shown in FIG. 11e. The Raman spectroscopy confirmed the uptake of PANI in the PANI/CNT nanocomposite, exhibiting typical bands attributed to the doped PANI. [33,39] Raman results from the carbonized PANI (ES form) were also in good agreement with literature. [30,40] Specifically, the characteristic Raman bands of the PANI disappeared after heating to 800° C. and two main bands (G- and D-bands) of carbonized nanocomposite were observed. The G- and D-bands were broadened due to increasing disorder and amorphous carbon content, indicating the presence of carbonized PANI in the nanocomposite. Overall weight loss of the PANI/CNT nanocomposites after carbonization at 800° C. in N2 atmosphere was 30% as determined by TGA (Supporting Information Figure S1). The thermogram of polyaniline (EB) showed a weight loss of 10% from room temperature to 400° C. and weight loss of 42% from 400-1000° C., in good agreement with data reported in literature. [35,40]

The maximum stretching level achieved with the CNT sheet was 33% strain at a crosshead speed of 1 mm/min. The CNTs were well aligned along the stretch direction and well coated by PANI during in-situ polymerization as shown in FIGS. 12a and b. Polarized Raman spectroscopy on a pristine CNT sheet (FIG. 12c) and a PANI/CNT nanocomposite (FIG. 12d), both stretched and unstretched are also shown. The increased alignment of the CNTs in the stretched sheets is reflected in the increased intensity of the G peak in the Raman polarization spectra aligned with the stretch direction relative to the G peak for the polarization spectra perpendicular to this axis. This is consistent with results reported in the literature for aligned CNTs.[41]

FIG. 13 shows the changes in mechanical properties as a function of the level of stretching for a pristine CNT sheet and various PANI/CNT sheet nanocomposites. The measured specific tensile strength and specific Young's modulus of the untreated CNT sheet were 160±16 MPa/(g/cm3) and 0.8±0.3 GPa/(g/cm3), respectively, and the elongation at failure was 50.3±4.5%. In-situ polymerization, which resulted in PANI reinforcement of the CNT networks, increased the specific strength to 239±16 MPa/(g/cm3). The Young's modulus increased by an order of magnitude to 9.0±0.2 GPa/(g/cm3) compared to the untreated CNT sheet. The specific tensile strength and specific Young's modulus are expected to increase with the stretch level of the PANI/stretched CNT sheet nanocomposites due to alignment of the CNTs along the tensile load direction. Stretching the as-manufactured sheets not only increased the alignment of the CNTs in the stretch direction, but also densified the sheet, eliminating some inter-tubular voids to increase tube packing. Stretching the pristine sheets significantly improves their specific modulus (FIG. 13b) and also has a positive, though weaker, effect on their specific strength (FIG. 13a). These trends are reversed for the PANI/CNT sheet nanocomposites, for which the specific strength increases sharply with stretching while the specific modulus increases only slightly, although there is significant scatter in the data at higher stretching ratios.

The failure mode in the relatively thick pristine CNT sheet is likely shear sliding between the tubes and layers of CNT sheets. CNT sheet strength is limited by characteristics such as CNT length, type, and quality. In the nanocomposites, the polymer binds the tubes so that intertube slippage is minimized. Clearly, the composition of the polymer is important because good interfacial interaction between the polymer binder and the CNTs is required for effective load transfer. The CNT alignment has the largest effect on the Young's modulus of the pristine CNT sheets, while their strength is not significantly enhanced due to the weak interfacial shear strength of bare CNTs.[13] The elongation at failure in the pristine CNT sheet, shown in FIG. 13c, decreased linearly as a function of the level of stretching while the PANI/CNT nanocomposites showed a plateau at around 10% of elongation in the highly stretched samples. These results suggest that the PANI/CNT nanocomposites from highly stretched (over 20%) CNT sheets are tougher than the pristine CNT sheets with the same level of stretching (FIG. 13d), as expected based on the enhanced strength exhibited by the nanocomposite relative to the pristine CNT sheet. This indicates that the intertube load transfer and interfacial adhesion between PANI and CNT are much improved by PANI polymerization in relatively dense CNT sheets.

The effects of post-processing treatments on the mechanical properties of the PANI/CNT sheet nanocomposites are summarized in FIGS. 14 and 15. Methods investigated include solvent treatment, stretching, in-situ polymerization (FIG. 14), hot pressing and carbonization (FIG. 15). Solvent treatment, especially with acetone, increases CNT sheet density. This densification has little effect on the specific strength, as shown in FIG. 14a, but the specific modulus (FIG. 14b) increases substantially. Starting with an acetone treated nanocomposite offers no benefit in strength or modulus after stretching, as can be seen by comparing the properties of the 20% stretched pristine (PC20) and acetone treated (PAC20) samples in FIGS. 14a and 14b.

Figure 15C:
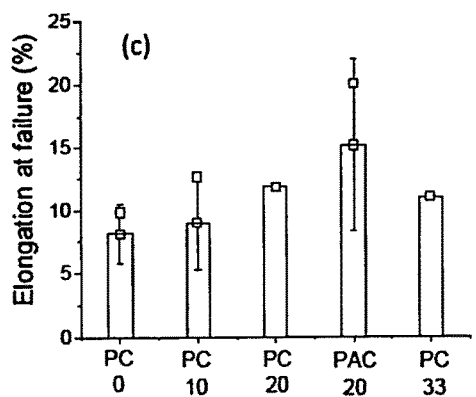
FIG. 15C shows a comparison of the average elongation at failure of PANI/CNT sheet nanocomposites post-processed by hot press; where the error bars represent the standard deviation in the values, the open squares are the measured maximum values at each sample, the level of stretch of CNT sheet before PANI polymerization was varied as 0, 10, 20, and 33% and the resulting nanocomposites were named as PC0, PC10, PC20, and PC33, respectively, while the PAC20 represents a PANI/stretched CNT sheet nanocomposite prepared with a 20% stretched acetone treated CNT sheet and the PC20HP represents a PANI/stretched CNT sheet nanocomposite prepared with a 20% stretched CNT sheet and then experienced a hot press before carbonization.
Figure 15G:
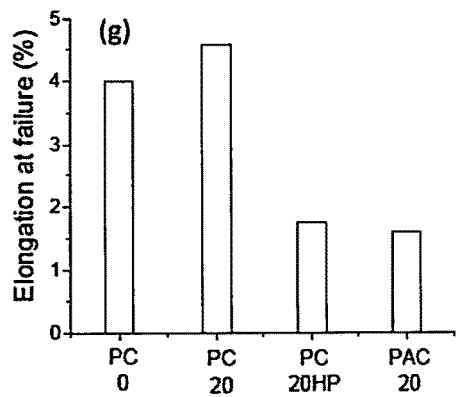
FIG. 15G shows a comparison of the average elongation at failure of PANI/CNT sheet nanocomposites post-processed by carbonization; where the level of stretch of CNT sheet before PANI polymerization was varied as 0 and 20% and the resulting nanocomposites were named as PC0 and PC20, respectively, while the PAC20 represents a PANI/stretched CNT sheet nanocomposite prepared with a 20% stretched acetone treated CNT sheet and the PC20HP represents a PANI/stretched CNT sheet nanocomposite prepared with a 20% stretched CNT sheet and then experienced a hot press before carbonization.

The highest specific tensile strength [484 MPa/(g/cm3)] was obtained with the PANI/stretched CNT sheet nanocomposites in which the 33% stretched CNT sheet was impregnated with PANI via in-situ polymerization, and then consolidated by hot pressing (FIG. 15a). Hot pressing also had a small but positive effect on the specific modulus of the nanocomposites (FIG. 15b). Despite good adhesion between PANI and the CNTs, the Young's modulus of the hot pressed PANI/CNT sheet nanocomposites is about an order of magnitude lower than that of the state-of-the-art epoxy/CNT sheet nanocomposites [25], possibly due to the high void content (FIG. 11) in the fabricated nanocomposites. Further infiltration of epoxy resin with as-prepared PANI/CNT sheet nanocomposites could potentially improve the mechanical property by filling in the voids with a structural engineering polymer.

The highest specific Young's modulus, 17.1 GPa/(g/cm3), was obtained with PANI/stretched CNT sheet nanocomposite after hot pressing and carbonization. Hot pressing reduced voids and densified the nanocomposite to enhance the extent of inter-tube contacts, thus improving mechanical properties. However, the Young's modulus of this carbonized PANI/CNT nanocomposite is much lower than that of typical engineering carbon fiber reinforced composites. The anticipated improvement in modulus was not realized, very likely due to the high catalyst content in the starting CNT material. High temperature carbonization of the PANI/CNT nanocomposites where the CNT contained ~10 wt % iron catalyst provides a degradation mechanism from oxidation of the CNT by oxygen released from the iron oxide catalyst. This reaction results in the generation of voids that severely weaken the mechanical property of the carbonized PANI/CNT nanocomposites.

Figure 15D:
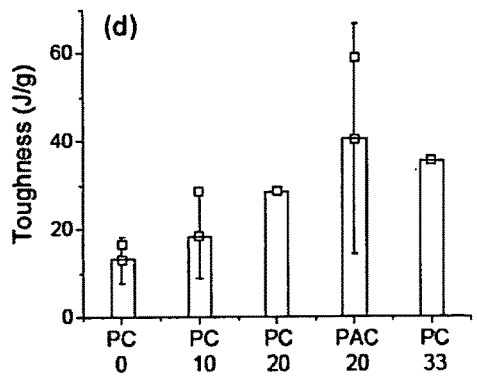
FIG. 15D shows a comparison of the average toughness of PANI/CNT sheet nanocomposites post-processed by hot press; where the error bars represent the standard deviation in the values, the open squares are the measured maximum values at each sample, the level of stretch of CNT sheet before PANI polymerization was varied as 0, 10, 20, and 33% and the resulting nanocomposites were named as PC0, PC10, PC20, and PC33, respectively, while the PAC20 represents a PANI/stretched CNT sheet nanocomposite prepared with a 20% stretched acetone treated CNT sheet and the PC20HP represents a PANI/stretched CNT sheet nanocomposite prepared with a 20% stretched CNT sheet and then experienced a hot press before carbonization.
Figure 15H:
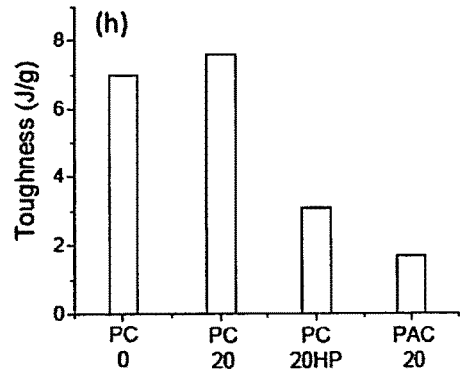
FIG. 15H shows a comparison of the average toughness of PANI/CNT sheet nanocomposites post-processed by carbonization; where the level of stretch of CNT sheet before PANI polymerization was varied as 0 and 20% and the resulting nanocomposites were named as PC0 and PC20, respectively, while the PAC20 represents a PANI/stretched CNT sheet nanocomposite prepared with a 20% stretched acetone treated CNT sheet and the PC20HP represents a PANI/stretched CNT sheet nanocomposite prepared with a 20% stretched CNT sheet and then experienced a hot press before carbonization.

Generally, hot pressing had a larger effect on tensile strength, while carbonization had a greater impact on the Young's modulus. Elongation at failure decreased considerably after in-situ polymerization, and even more significantly upon stretching and carbonization. As a result, toughness also decreased significantly, especially, after the carbonization process. As shown in FIG. 15h, the toughnesses of the PANI/stretched CNT sheet nanocomposites were in the range of 1.7 to 7.6 J/g after carbonization while that of the untreated CNT sheet was 47.8±7.3 J/g (FIG. 14d). While hot pressing improved the strength of the PANI/CNT nanocomposites, there was minimal decrease in toughness to 40 J/g at 20% stretch, as shown in FIG. 15d. The toughness value is somewhat lower than that of state-of-the-art CNT yarns (close to 100 J/g). [20,42] In general, the form of PANI, i.e. emeraldine salt (ES, electrically conductive form) or emeraldine base (EB, non-conductive form) did not affect the mechanical properties of the resultant nanocomposite. The reported mechanical data were measured with ES form of PANI.

Figure 16:
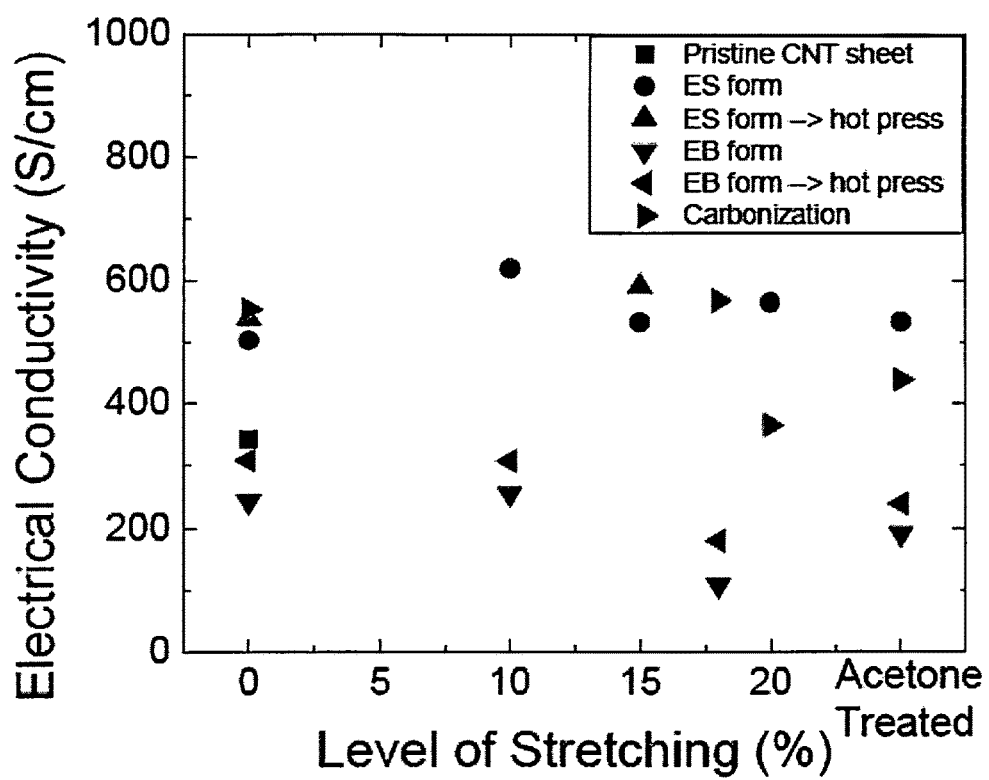
FIG. 16 shows a graph of the DC-electrical conductivity of the processed PANI/CNT sheet nanocomposites where ES and EB stand for emeraldine salt (electrically conductive form) and emeraldine base (electrically non-conductive form), respectively.

The DC-electrical conductivity of the PANI/CNT nanocomposites along the CNT aligned direction was measured by using a 4-point probe and the results are summarized in FIG. 16. The DC-electrical conductivity of the pristine CNT sheet was 342±37 S/cm. The DC-electrical conductivity had a significant dependence on the initial form of PANI used; the highest values were obtained with the PANI/stretched CNT sheet nanocomposites (621±10 S/cm) in which the PANI was in the emeraldine salt form. Generally, hot pressing increased the electrical conductivity in both PANI forms due to densification of the materials. The electrical conductivity of carbonized PANI/CNT nanocomposite was not influenced by the form of PANI.

Figure 17A:
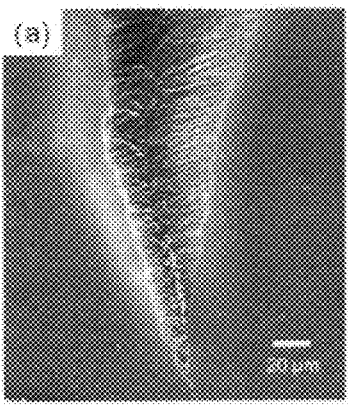
FIG. 17A shows an HR-SEM image of the PANI/CNT nanocomposites half-failed during in-situ tensile testing.
Figure 17B:
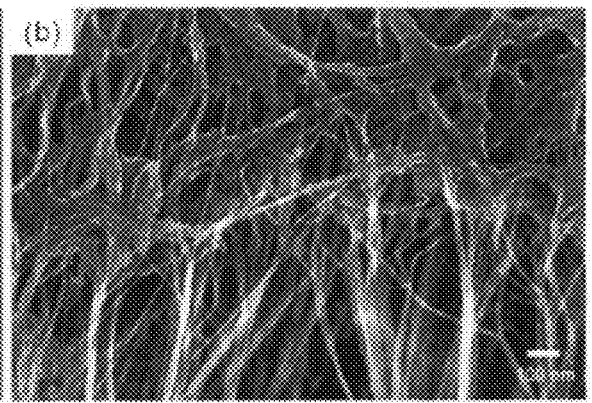
FIG. 17B shows an HR-SEM image of the PANI/CNT nanocomposites at the failed site after tensile testing.
Figure 17C:
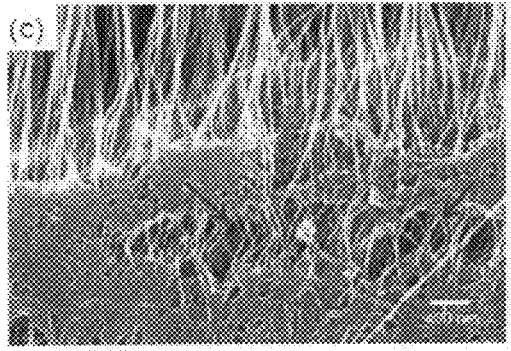
FIG. 17C shows an HR-SEM image of the hot pressed PANI/CNT nanocomposites in the failed site.
Figure 17D:
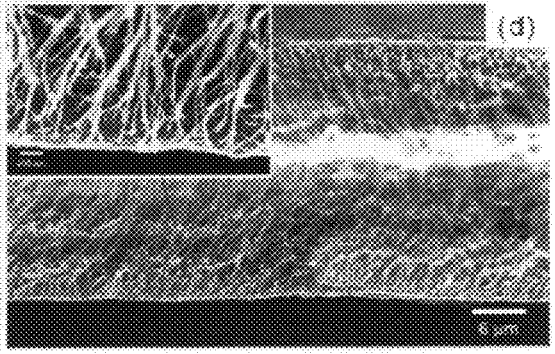
FIG. 17D shows an HR-SEM image of the hot pressed PANI/CNT nanocomposites in a cross-sectional view after tensile testing.

Failure mechanism of pristine CNT sheet and PANI/CNT nanocomposites. The failure mechanisms of the pristine CNT sheets and the PANI/CNT nanocomposites were examined at the micron scale with an in-situ tensile tester (Gatan Microtest 200 stage and Deben controller) equipped with an optical and an electron microscope. A strip of the pristine CNT sheet was placed under a tensile strain and its failure behavior was observed with an optical microscope. Interpretation of the failure mechanism of the pristine CNT sheets is complicated by the variations in CNT sheet morphologies.[43] Failure mechanisms noted within the pristine CNT sheet included breaking, sliding, de-bundling, telescoping, and delamination. The pristine CNT sheet is composed of many layers of highly entangled, mostly double-walled CNTs held together by both van der Waals interactions between the tubes and the bundles and physical entanglements. Pristine CNT sheets tended to fail by a combination of mechanisms that include surface fracture and sliding of the bundles during stretching, as well as delamination of the separated layers, mostly close to the grips due to the auxetic behavior under a tensile load.[44] However, the failure mechanism changed with the addition of PANI binder. PANI served to bind the CNT networks preventing delamination of the CNT layers. Failure was initiated at one of the sample edges by localized stress during necking under a tensile load, and then propagated unidirectionally with simultaneous failure cracks as shown in FIG. 17. Multiple cracks developed from uneven load distribution in the materials and were observed in both the PANI/CNT and the hot pressed PANI/CNT nanocomposites, as shown in FIGS. 17*b* and 17*c*, respectively. The PANI-coated CNTs oriented in the direction of the tensile load were partially broken first and subsequently telescoped from the CNT bundles or individual tubes during the continuous stretching. Telescoped CNTs bridged the cracks (marked by arrows in FIGS. 17*b* and 17*c*) and transferred load until complete failure of the material occurred. Telescoped CNTs were cleaner and thinner (FIG. 17*d*) compared to the tube bundles in the PANI/CNT nanocomposites. Considering the mechanical data of the stretched samples (FIGS. 13 and 14), these studies strongly suggest that better alignment of the CNTs in the axial direction and better adhesion between the tube and the polymer binder to reduce in-plane failure are critical factors to achieving maximum load transfer in the CNT based nanocomposites.

Obviously, many modifications may be made without departing from the basic spirit of the present invention. Accordingly, it will be appreciated by those skilled in the art that within the scope of the appended claims, the invention may be practiced other than has been specifically described herein. Many improvements, modifications, and additions will be apparent to the skilled artisan without departing from the spirit and scope of the present invention as described herein and defined in the following claims.

LIST OF REFERENCES

[1] Wong E W, Sheenhan P E and Lieber C M 1997 *Science* 277, 1971-1975
[2] Treacy M M J, Ebbesen T W and Gibson J M 1996 *Nature* 381, 678-680
[3] Yu M-F, Lourie O, Dyer M J, Moloni K, Kelly T F and Ruoff R S 2000 *Science* 287, 637-640
[4] Zhu Y and Espinosa H D 2005 *Proc. Natl. Acad. Sci. USA* 102, 14503-14508
[5] Xie X L, Mai Y W, Zhou and X P 2005 *Mater. Sci. Engineer. R* 49, 89
[6] Moniruzzaman M and Winey K I 2006, *Macromolecules* 39, 5194-5205
[7] Coleman J N, Khan U, Blau W J and Gun'ko Y K 2006, *Carbon* 44, 1624-1652
[8] Spitalsky Z, Tasis D, Papagelis K and Galiotis C 2010 *Prog. Polym. Sci.* 35, 357-401
[9] Dalton A B, Collins S, Muñoz E, Razal J M, Ebron V H, Ferrari J P, Coleman J N, Kim B G and Baughman R H 2003 *Nature* 423 703
[10] Liu K, Sun Y, Lin X, Zhou R, Wang J, Fan S and Jiang K 2010 *ACS Nano* 4, 5827-5834
[11] Kis A, Csanyi G, Salvetat J-P, Lee T-N, Couteau E, Kulik A J, Beniot W, Brugger J and Forro L 2004 *Nature Mater.* 3, 153-157
[12] Krasheninnikov A V and Banhart F 2007 *Nature Mater.* 6, 723-733
[13] Peng B, Locascio M, Zapol P, Li S, Mielke S, Schatz G C and Espinosa H D 2008 *Nature Nanotechnol.* 3, 626-631
[14] Filleter T, Bernal R, Li S and Espinosa H D 2011 *Adv. Mater.* 23, 2855-2860
[15] Filleter, T.; Espinosa, H. D. *Carbon* 2013, 56, 1-11.
[16] Braga S F and Galvão D S 2006 *Chem. Phys. Lett.* 419, 394-399
[17] Zhang, Z.; Li, Q. *ACS Nano* 2010, 4, 312-316.
[18] Shim, B. S.; Zhu, J.; Jan, E.; Critchley, K.; Ho, S.; Podsiadlo, P.; Sun, K.; Kotov, N. A. *ACS Nano* 2009, 3, 1711-1722.
[19] Yi, B.; Rajagopalan, R.; Foley, H. C.; Kim, U. J.; Liu, X.; Eklund, P. C. *J. Am. Chem. Soc.* 2006, 128, 11307-11313.
[20] Boncel, S.; Sundaram, R. M.; Windle, A. H.; Koziol, K. K. K. *ACS Nano* 2011, 5, 9339-9344.
[21] Li, S.; Zhang, X.; Zhao, J.; Meng, F.; Xu, G.; Yong, Z.; Jia, J.; Zhang, Z.; Li, Q. *Compos. Sci. Technol.* 2012, 72, 1402-1407.
[22] Di, J.; Hu, D.; Chen, H.; Yong, Z.; Chen, M.; Feng, Z.; Zhu, Y.; Li, Q. *ACS Nano* 2012, 6, 5457-5464.
[23] Sreekumar, T. V.; Liu, T.; Kumar, S.; Ericson, L. M.; Hauge, R. H.; Smalley, R. E. *Chem. Mater.* 2003, 15, 175-178.
[24] Wang, Z.; Laing, Z.; Wang, B.; Zhang, C.; Kramer, L. *Compos. Part A-Appl. S.* 2004, 35, 1225-1232.
[25] Cheng, Q.; Bao, J.; Park, J. G.; Laing, Z.; Zhang, C.; Wang, B. *Adv. Func. Mater.* 2009, 19, 3219-3225.
[26] Chen, T.; Cai, Z.; Qiu, L.; Li, H.; Ren, J.; Lin, H.; Yang, Z.; Sun, X.; Peng, H. *J. Mater. Chem.* A 2013, 1, 2211-2216.
[27] Blighe, F. M.; Diamond, D.; Coleman, J. N.; Lahiff, E. Carbon 2012, 50, 1447-1454.
[28] Xu, J.; Yao, P.; Jiang, Z.; Liu, H.; Li, X.; Liu, L.; Li, M.; Zheng, Y. *J. Appl. Polym. Sci.* 2012, 125, E334-E341.
[29] Gu, H.; Tadakamalla, S.; Zhang, X.; Huang, Y.; Jiang, Y.; Colorado, H. A.; Luo, Z.; Wei, S.; Guo, Z. *J. Mater. Chem. C* 2013, 1, 729-743.
[30] Moravkova, Z.; Trchova, M.; Tomsik, E.; Cechvala, J.; Stejskal, *J. Polym. Degrad. Stabil.* 2012, 97, 1405-1414.
[31] Jin, C.; Nagaiah, T. C.; Xia, W.; Spliethoff, B.; Wang, S. S.; Bron, M.; Schuhmann, W.; Muhler, M. *Nanoscale* 2010, 2, 981-987.
[32] Li, L. M.; Liu, E. H.; Li, J.; Yang, Y. J.; Shen, H. J.; Huang, Z. Z.; Xiang, X. X.; Li, W. *J. Power Sources* 2010, 195, 1516-1521.

[33] Cochet, M.; Maser, W. K.; Benito, A. M.; Alicia Callejas, M.; Teresa Martinez, M.; Benoit, J.-M.; Schreiber, J.; Chauvet, O. *Chem. Commun.* 2001, 1450-1451.

[34] Zengin, H.; Zhou, W.; Jin, J.; Czerw, R.; Smith Jr., D. W.; Echegoyen, L.; Carroll, D. L.; Foulger, S. H.; Ballato, *Adv. Mater.* 2002, 14, 1480-1483.

[35] Feng, W.; Bai, X. D.; Lian, Y. Q.; Liang, J.; Wang, X. G.; Yoshino, K. Carbon 2003, 41, 1551-1557.

[36] J. Sainz, R.; Benito, A. M.; Teresa Martinez, M.; Galondo, J. F.; Sotres, J.; Baro, A. M.; Corraze, B.; Chauvet, O.; Maser, W. K. *Adv. Mater.* 2005, 17, 278-281.

[37] Ma, Y.; Cheung, W.; Wei, D.; Bogozi, A.; Chiu, P. L.; Wang, L.; Pontoriero, F.; Mendelsohn, R.; He, H. *ACS Nano* 2008, 2, 1197-1204.

[38] Kim, J.-W.; Lillehei, P. T.; Park, C. *J. Mater. Chem.* 2012, 22, 8408-8412.

[39] Cochet, M.; Louarm, G.; Quillard, S.; Buisson, J. P.; Lefrant, S. *J. Raman Spectrosc.* 2000, 31, 1041-1049.

[40] Tomsik, E.; Moravkova, Z.; Stejskal, J.; Trchova, M.; Salek, P.; Kovarova, J.; Zemek, J.; Cieslar, M.; Prokes, *J. Chem. Pap.* 2013, 67, 1054-1065.

[41] Zamora-Ledezma, C.; Blanc, C.; Maugey, M.; Zakri, C.; Poulin, P.; Anglaret, E. *Nano Lett.* 2008, 8, 4103-4107.

[42] Naraghi, M.; Filleter, T.; Moraysky, A.; Locascio, M.; Loutfy, R. O.; Espinosa, H. D. *ACS Nano* 2010, 4, 6463-6476.

[43] Li, Y.; Kroger, M. *Carbon* 2012, 50, 1793-1806.

[44] Hall, L. J.; Coluci, V. R.; Galvão, D. S.; Kozlov, M. E.; Zhang, M.; Dantas, S. O.; Baughman, R. H. *Science* 2008, 320, 504-507.

What is claimed is:

1. A method for forming a carbonized carbon nanotube nanocomposite, the method comprising:
    stretching a carbon nanotube material up to a 33% strain to form a stretched carbon nanotube material;
    immersing the stretched carbon nanotube material in a monomer solution, wherein monomer of the solution physically adsorbs onto carbon nanotube surfaces of the stretched carbon nanotube material;
    polymerizing the monomer in-situ to form a layer of π-conjugated conductive polymer on the carbon nanotube surfaces of the stretched carbon nanotube material, wherein the π-conjugated conductive polymer essentially locks the stretched structure of the carbon nanotube material, and wherein the π-conjugated conductive polymer layer has a thickness from 3 nm to 20 nm;
    hot pressing the stretched carbon nanotube material having the π-conjugated conductive polymer formed on the carbon nanotube surfaces thereof to form a consolidated carbon nanotube composite; and
    carbonizing the consolidated carbon nanotube composite at a temperature of about 800° C. in an inert atmosphere to form the carbonized carbon nanotube nanocomposite.

2. The method of claim 1, wherein the carbon nanotube material is selected from the group consisting of a carbon nanotube sheet, a carbon nanotube tape, and a carbon nanotube yarn.

3. The method of claim 1, wherein the monomer is aniline.

4. The method of claim 1, wherein the solution is an acidic aqueous solution and the monomer is aniline.

5. The method of claim 4, wherein the π-conjugated conductive polymer is polyaniline (PANI).

6. The method of claim 5, wherein the PANI polymer layer thickness is controlled by adjusting the polymerization time and the aniline concentration in the acidic aqueous solution.

7. The method of claim 1, wherein the hot pressing step occurs at a temperature between 25° C. and 300° C. and a pressure between 1 MPa and 2 GPa.

8. The method of claim 1, wherein the inert atmosphere is of nitrogen gas.

9. The method of claim 1, wherein the carbon nanotube material is a carbon nanotube sheet.

10. The method of claim 9, wherein the stretching of the carbon nanotube sheet prior to the in-situ polymerization step is performed in a dry environment.

11. The method of claim 1, wherein the stretching of the carbon nanotube material prior to the in-situ polymerization step is performed in a solvent.

12. The method of claim 11, wherein the solvent is selected from the group consisting of acetone, methanol, N-methylpyrrolidone, and ethanol.

13. The method of claim 1, wherein the consolidated carbon nanotube composite has a tensile strength from 239 MPa/(g/cm$^3$) to 484 MPa/(g/cm$^3$).

14. The method of claim 1, wherein the hot-pressed and carbonized carbon nanotube nanocomposite has a Young's Modulus from 9.0 GPa/(g/cm$^3$) to 17.1 GPa/(g/cm$^3$).

15. The method of claim 1, wherein the stretched carbon nanotube material includes a delocalized π electron system on the carbon nanotubes thereof.

16. The method of claim 1, wherein the hot pressing step reduces the thickness of the stretched carbon nanotube material having the π-conjugated conductive polymer formed on the carbon nanotube surfaces thereof by 10% to 50%.

17. A method for forming a carbonized carbon nanotube nanocomposite, the method comprising:
    providing a carbon nanotube material;
    wetting the carbon nanotube material with acetone;
    stretching the acetone wetted carbon nanotube material up to a 33% strain to form a stretched carbon nanotube material having an extended, delocalized π electron system on carbon nanotubes thereof;
    immersing the stretched carbon nanotube material in a monomer solution, wherein dispersion interactions between the monomer in the monomer solution and the extended delocalized π electron system of the stretched carbon nanotube material causes the monomer to be adsorbed onto carbon nanotube surfaces of the stretched carbon nanotube material;
    polymerizing the monomer in-situ to form a layer of π-conjugated conductive polymer on the carbon nanotube surfaces of the stretched carbon nanotube material, wherein the π-conjugated conductive polymer essentially locks the stretched structure of the carbon nanotube material, wherein the π-conjugated conductive polymer layer has a thickness from 3 nm to 20 nm;
    hot pressing the stretched carbon nanotube material having the π-conjugated conductive polymer formed on the carbon nanotube surfaces thereof to form a consolidated carbon nanotube composite; and
    carbonizing the consolidated carbon nanotube composite at a temperature of about 800° C. in an inert atmosphere to form the carbonized carbon nanotube nanocomposite.

* * * * *